United States Patent [19]
Hess et al.

[11] Patent Number: 5,230,208
[45] Date of Patent: Jul. 27, 1993

[54] LAWN MOWER HEIGHT-ADJUST SYSTEMS

[75] Inventors: Kristoffer A. Hess; Ronald G. Hare; Ronald A. Jackson; Courtney F. Bond, all of Brockville, Canada

[73] Assignee: Black & Decker Inc., Newark, Del.

[21] Appl. No.: 939,382

[22] Filed: Aug. 28, 1992

Related U.S. Application Data

[63] Continuation of Ser. No. 531,991, Jun. 1, 1990, abandoned.

[51] Int. Cl.⁵ ............................................ A01D 34/74
[52] U.S. Cl. .................................. 56/17.2; 56/320.1; 172/43; 172/395; 280/43
[58] Field of Search .................. 56/17.1, 17.2, 320.1; 280/43, 43.11, 43.13, 43.16; 172/43, 395, 354, 421

[56] References Cited

U.S. PATENT DOCUMENTS

| | | |
|---|---|---|
| 212,076 | 2/1879 | Wilder . |
| 1,171,886 | 2/1916 | Ray . |
| 1,180,679 | 4/1916 | Thompson . |
| 2,776,844 | 1/1957 | Wilkin . |
| 2,848,859 | 8/1958 | Abel . |
| 2,882,063 | 4/1959 | Strasel . |
| 2,909,884 | 10/1959 | Knarzer .......................... 56/320.1 |

(List continued on next page.)

FOREIGN PATENT DOCUMENTS

| | | | |
|---|---|---|---|
| 245121 | 4/1960 | Australia ............................. | 280/43 |
| 5225341 | 3/1956 | Canada . | |
| 713777 | 7/1965 | Canada . | |
| 719424 | 10/1965 | Canada . | |
| 821784 | 9/1969 | Canada . | |
| 828425 | 12/1969 | Canada . | |
| 828427 | 12/1969 | Canada . | |
| 844284 | 6/1970 | Canada . | |
| 1087399 | 10/1980 | Canada . | |
| 1105717 | 7/1981 | Canada . | |
| 1251649 | 3/1989 | Canada . | |
| 2006643 | 8/1982 | Fed. Rep. of Germany ..... | 56/320.1 |
| 822248 | 4/1982 | South Africa . | |
| 328972 | 4/1958 | Switzerland . | |
| 878834 | 10/1961 | United Kingdom . | |
| 2147185 | 9/1985 | United Kingdom ................ | 172/395 |

OTHER PUBLICATIONS

1990 Mep Catalog pp. 1, 6 & 7 showing Cat. No. 948 "Tivoli" Lawnmower.
1987 Owner's Manual of Tivoli Cat. No. 943/E Lawnmower showing at pp. 1, 3, 6, 16, 17, 18 & 20 description of Ht.-adjust Features.
Dec. 1987 Wolf-Geräte Owners Manual, pp. 1, 3, 14, 15 & 16, for Lawnmower Height-Adjust Systems.

*Primary Examiner*—David J. Bagnell
*Attorney, Agent, or Firm*—Charles E. Yocum; Dennis A. Dearing; John D. Del Ponti

[57] ABSTRACT

Lawn mower height-adjust systems include three embodiments. Two permit the user to adjust the position of the deck relative to each wheel individually. The third permits the user to adjust the positions of all four wheels simultaneously, aided by a counterbalance system. A modification of the third embodiment is available to automatically bypass the height-adjust mechanism in the event an abnormally high load is placed on the deck. One of the two individual systems permits an operator to adjust the position of a respective wheel simply by removing a single nut and washer from an axle bolt. The second individual height-adjust system permits the operator to adjust the height of an individual wheel by using one hand, and without having to disassemble the mechanism. The system which adjusts all four wheels simultaneously links front and rear axle subassemblies with a connecting rod, and indexes all four wheels simultaneously through a release handle which is recessed in a cavity formed in the lawn mower deck. When the operator lifts the release handle, he or she may simultaneously grasp a portion of the deck with the same hand and easily raise or lower it to a desired position. A single unitary plastic deck is the foundation for each of the three height-adjust systems, thereby significantly reducing the cost otherwise incurred by manufacturing three separate types of lawn mowers.

21 Claims, 13 Drawing Sheets

U.S. PATENT DOCUMENTS

| | | |
|---|---|---|
| 2,986,402 | 5/1961 | Winton . |
| 3,130,793 | 6/1962 | Allegretti .............................. 172/15 |
| 3,161,006 | 12/1964 | Willette et al. . |
| 3,269,100 | 8/1966 | Smith . |
| 3,334,911 | 8/1967 | Enters . |
| 3,357,715 | 12/1967 | Plamper et al. . |
| 3,577,714 | 5/1971 | Dahl . |
| 3,677,574 | 7/1972 | Cyr . |
| 3,872,654 | 3/1975 | Brundage et al. . |
| 3,874,151 | 4/1975 | Seifert . |
| 3,972,160 | 8/1976 | Boswell . |
| 4,006,580 | 2/1977 | Kalleicher . |
| 4,167,093 | 9/1979 | Pfeiffer et al. . |
| 4,321,785 | 3/1982 | Kaland . |
| 4,711,077 | 12/1987 | Kutsukake et al. . |
| 4,835,952 | 6/1989 | McLane . |
| 4,899,524 | 2/1990 | Eilles . |
| 4,905,463 | 3/1990 | Eilles ..................................... 56/17.2 |

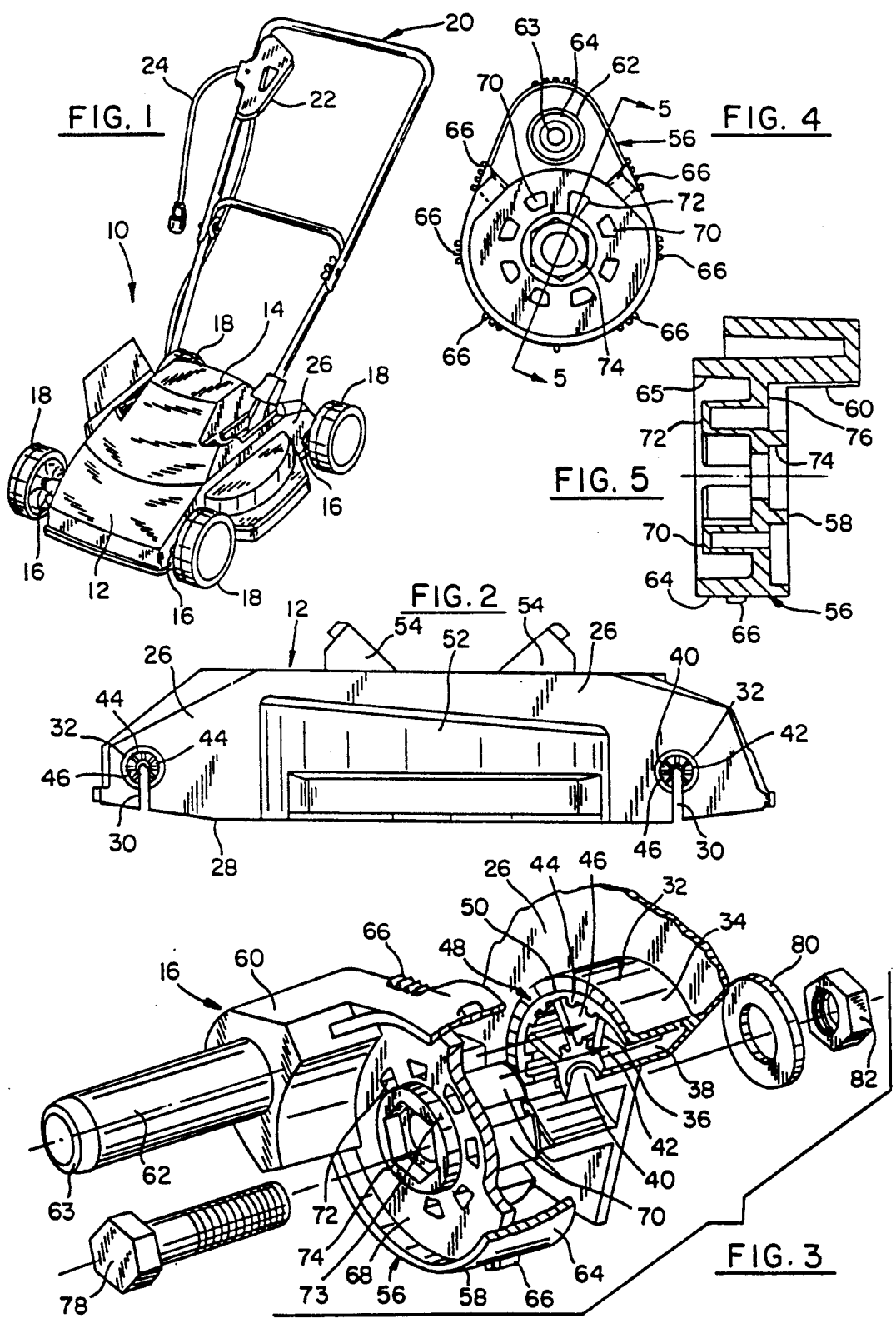

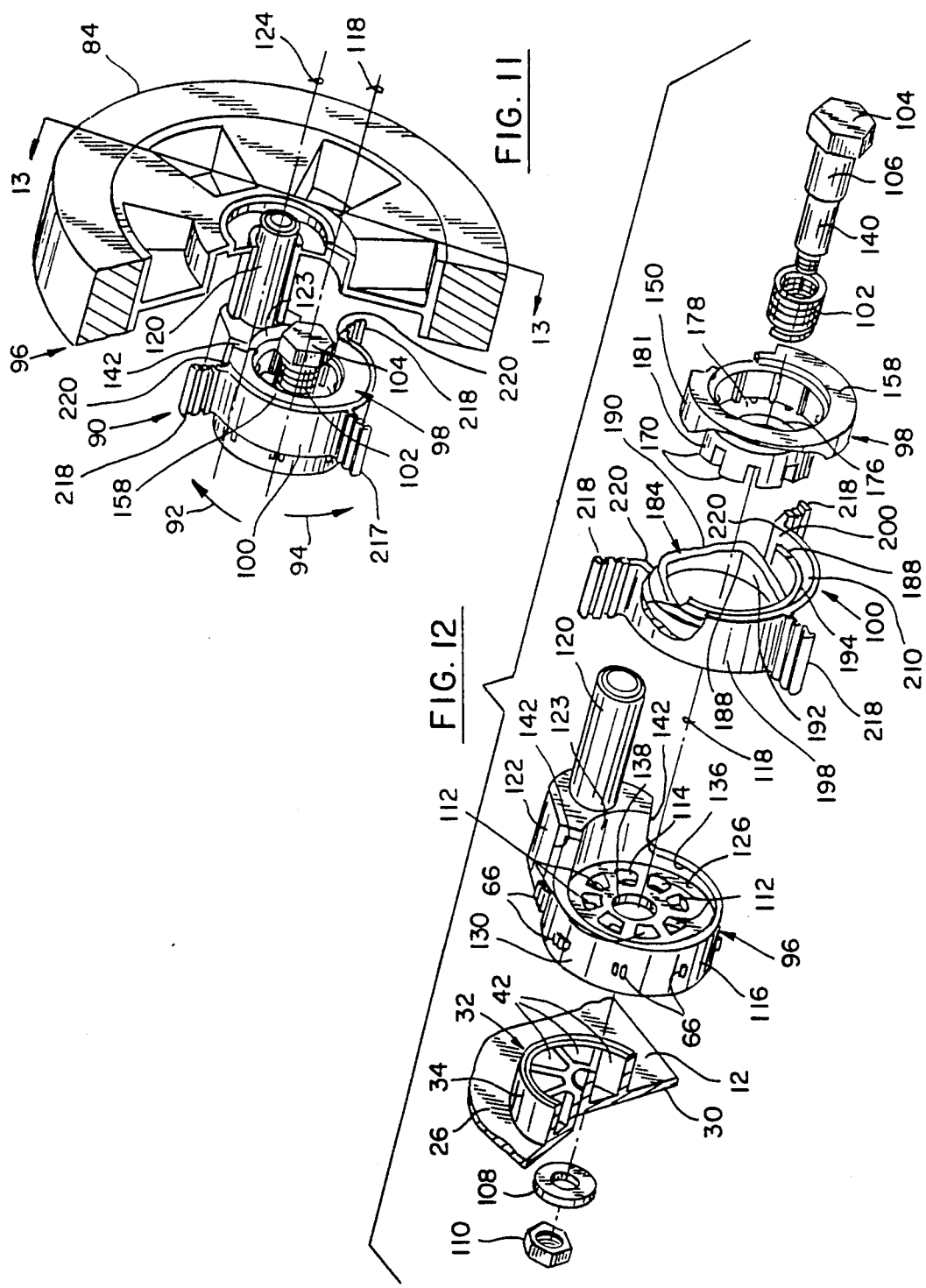

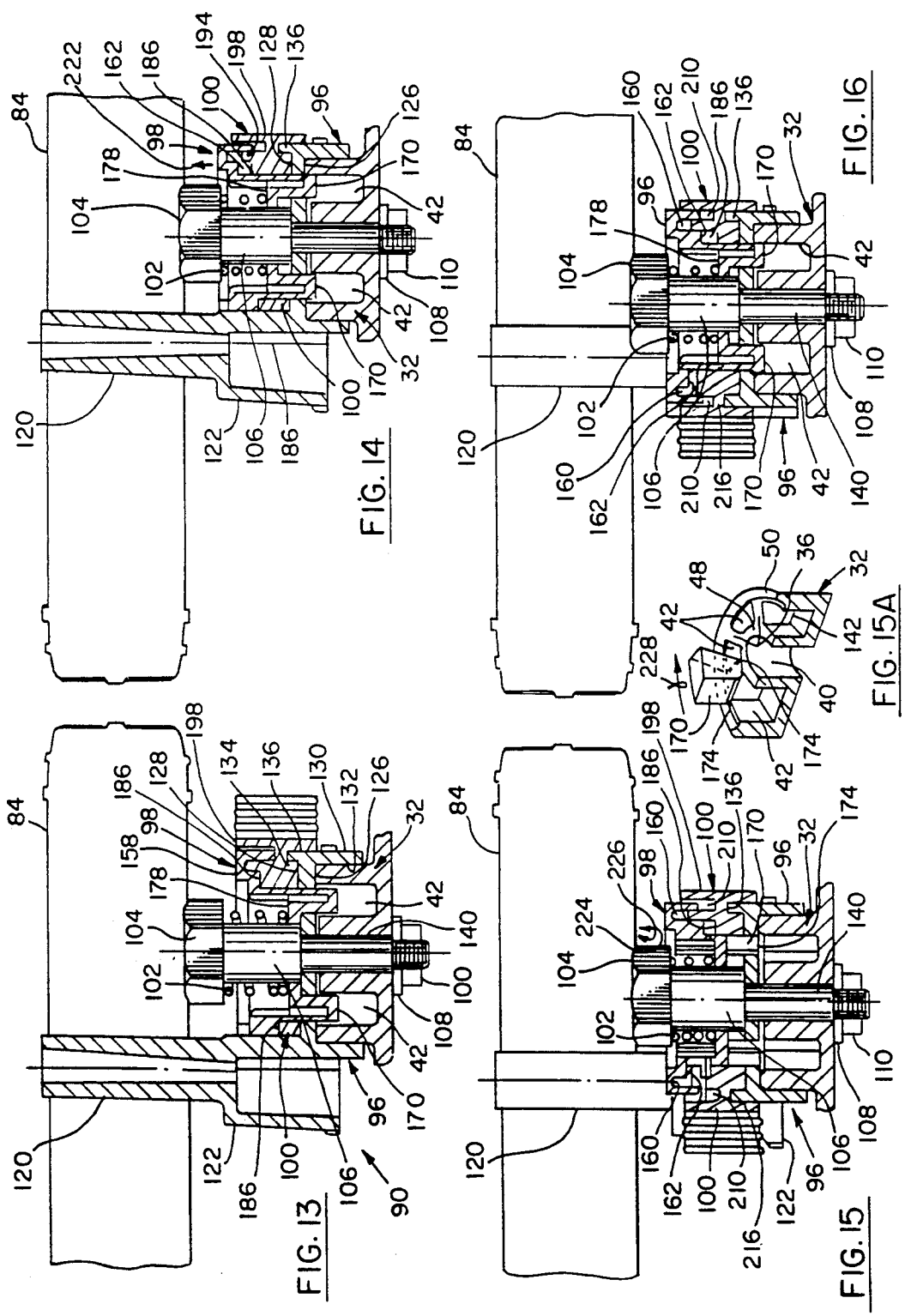

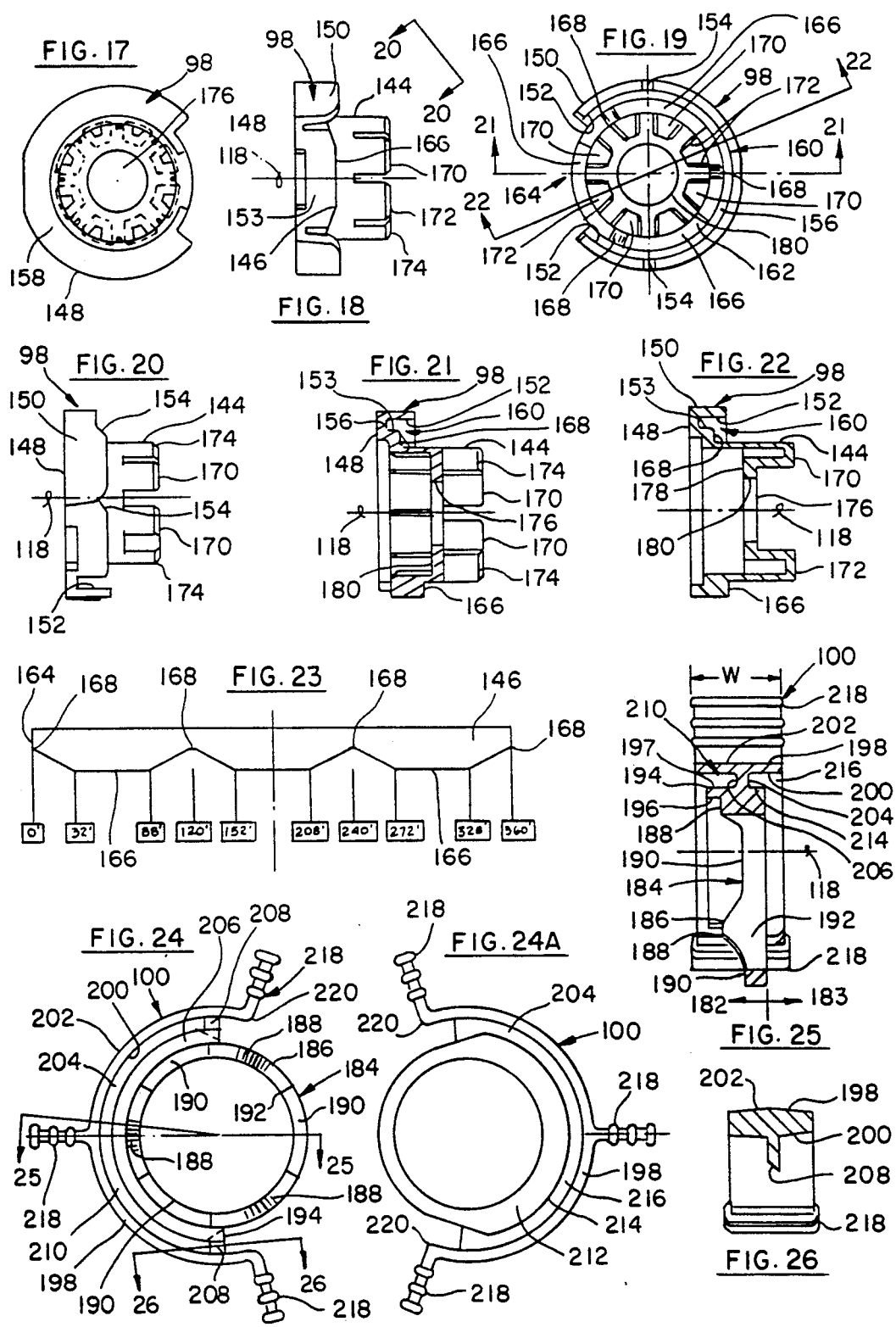

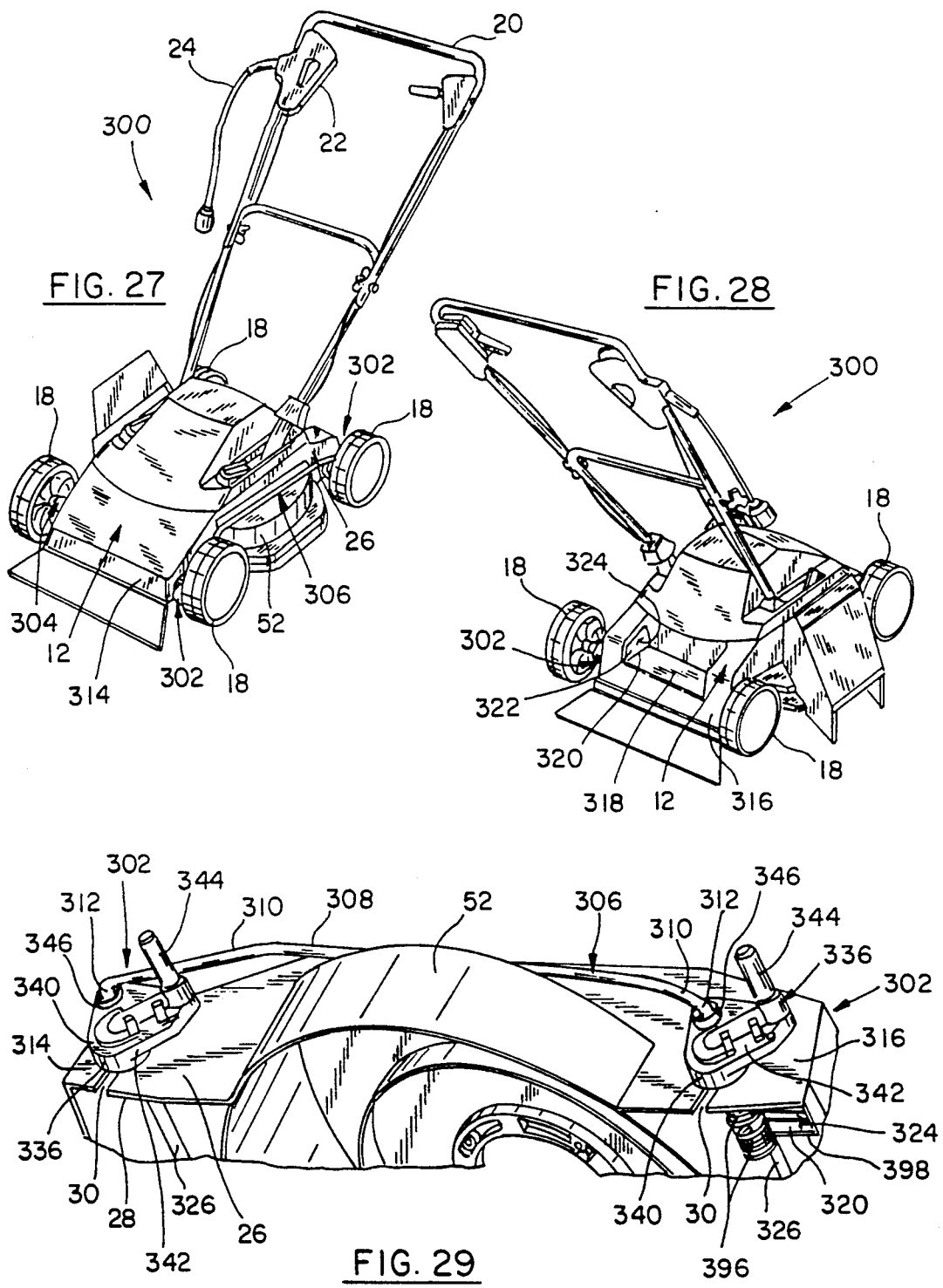

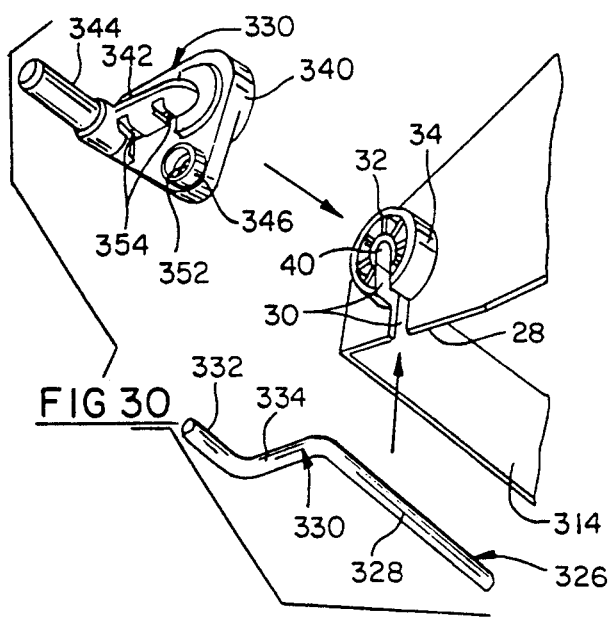
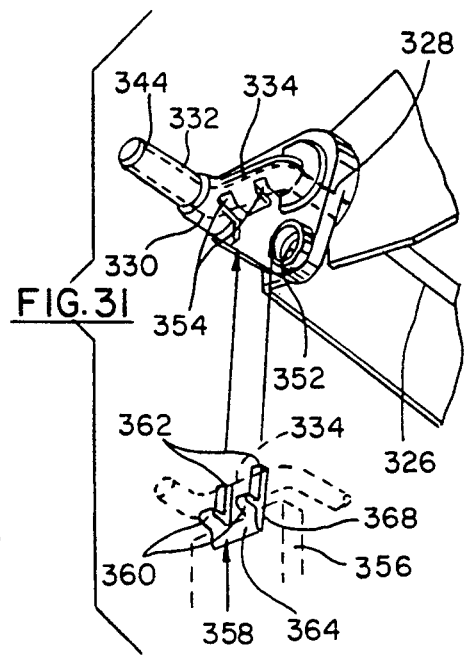
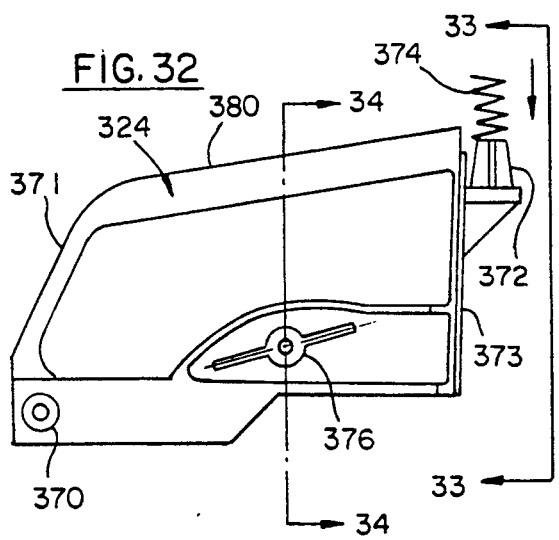
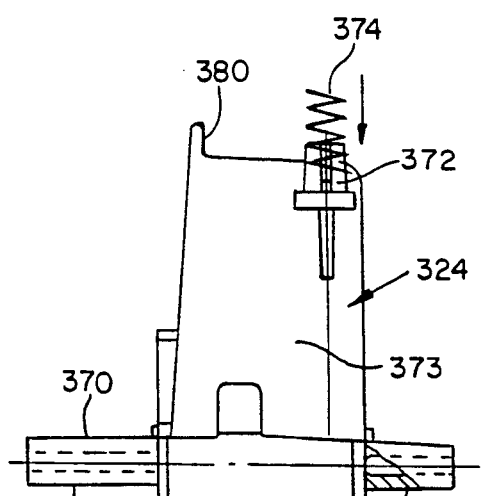
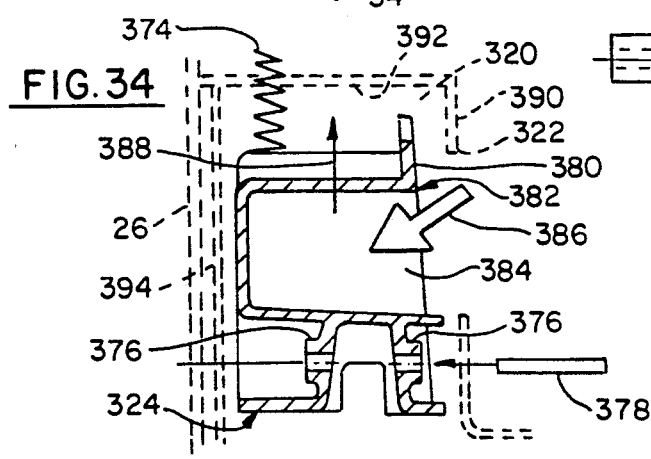

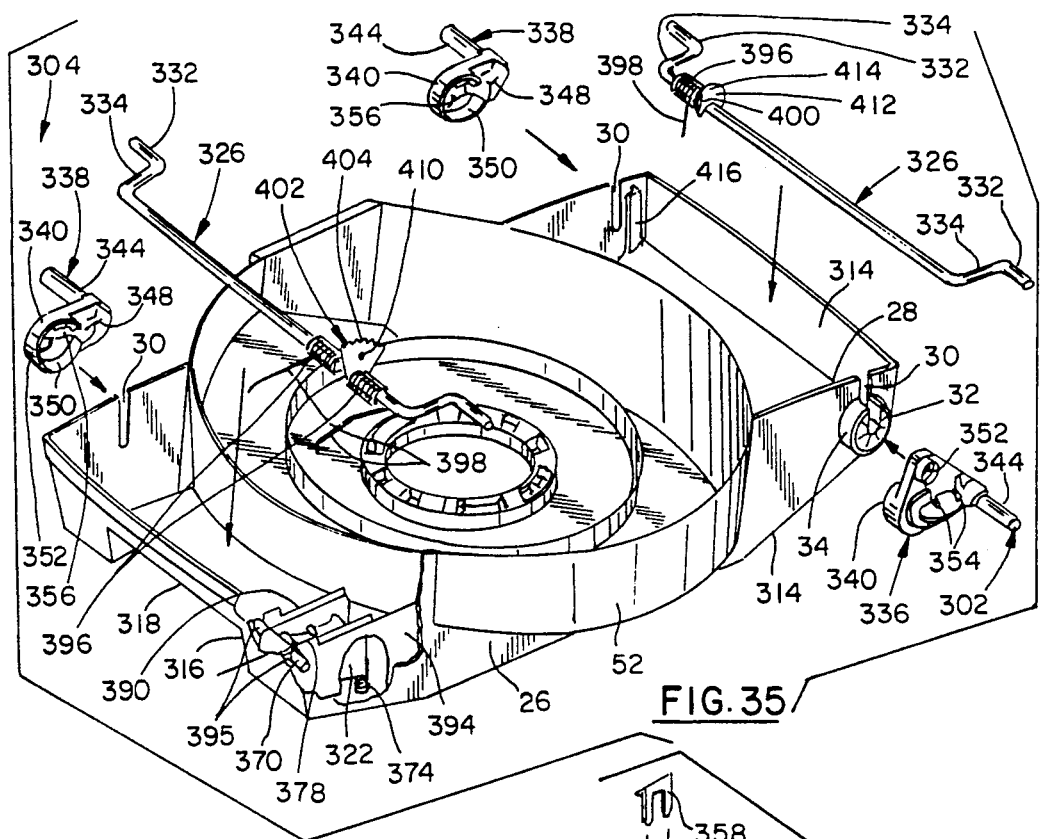
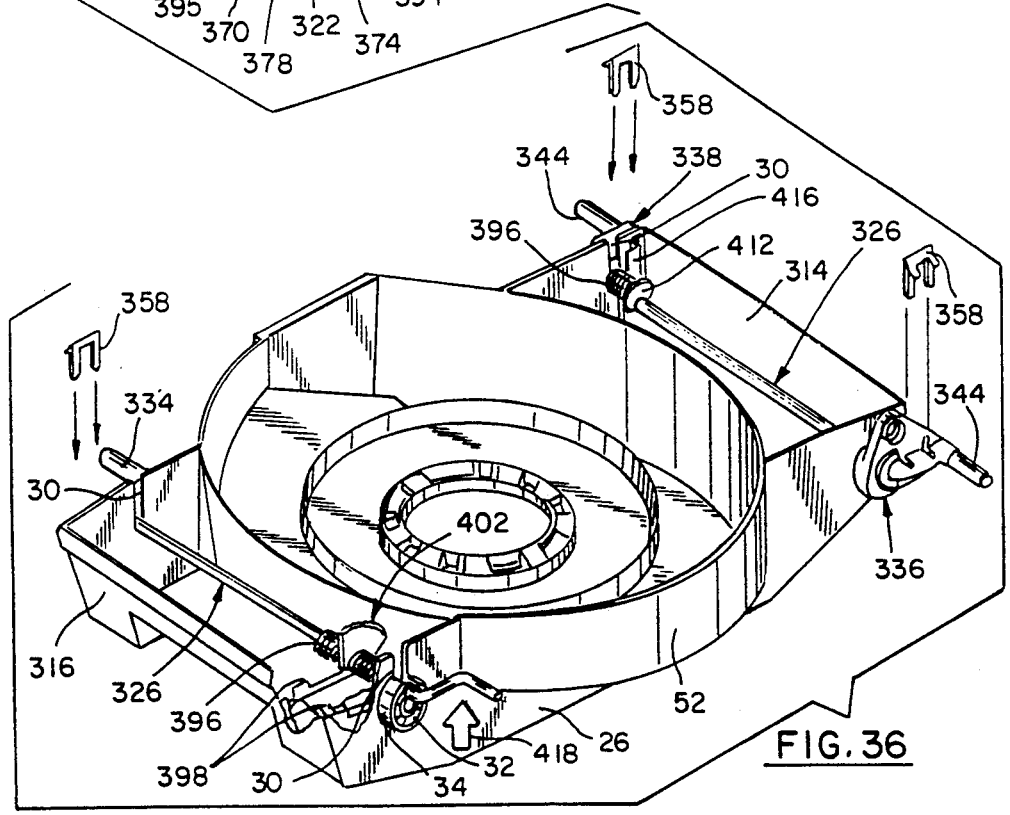

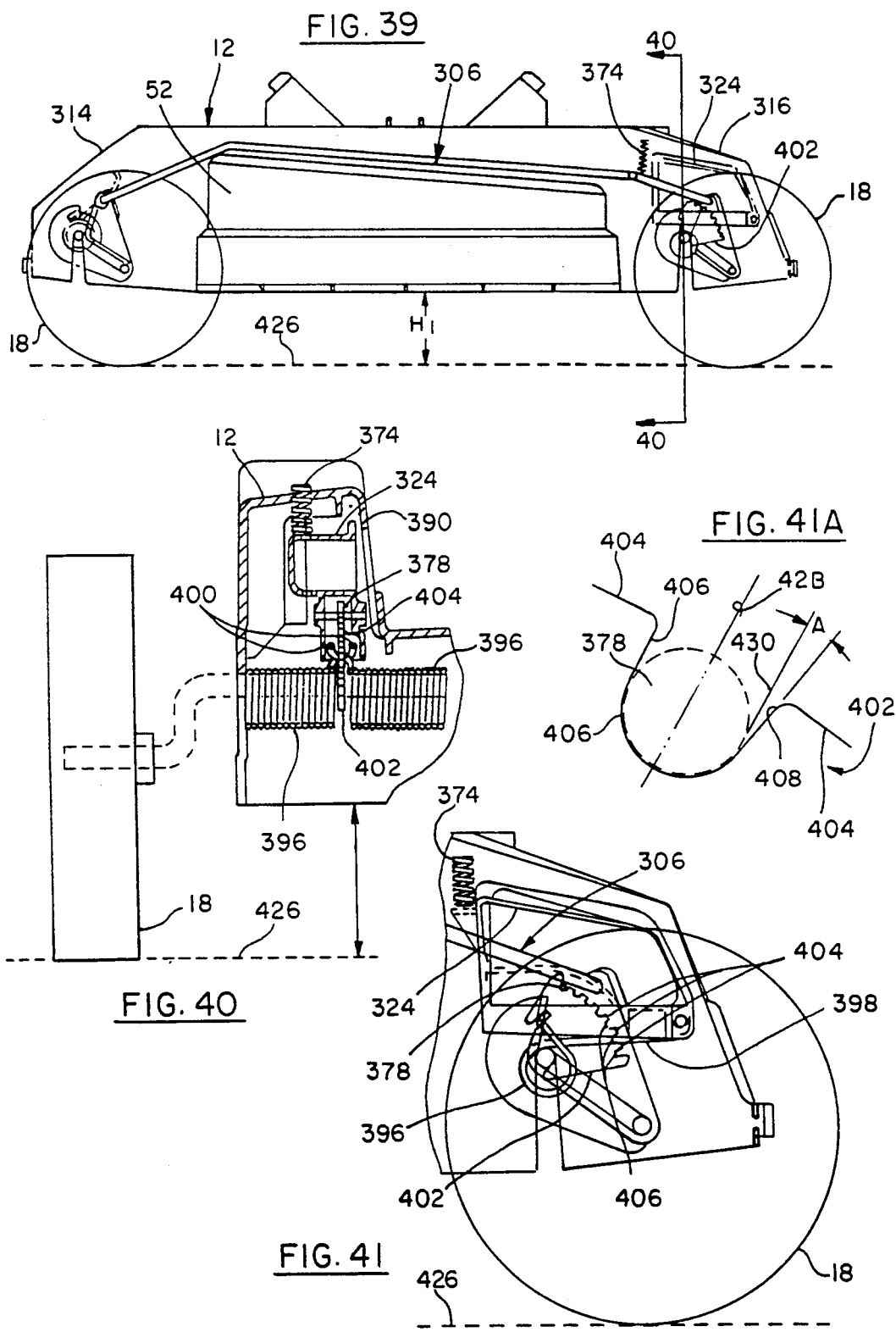

LAWN MOWER HEIGHT-ADJUST SYSTEMS

This application is a continuation of application Ser. No. 531,991, filed Jun. 1, 1990, now abandoned.

FIELD OF THE INVENTION

This invention relates to systems for adjusting the heights of wheeled vegetation-cutting and lawn-treating machines, particularly lawn mowers, whether gas- or electric-powered.

BACKGROUND OF THE INVENTION

Lawn mower height-adjust systems are basically of two types: those in which individual adjustments are made to each wheel height, and those in which the positions of two or more wheels are adjusted simultaneously. Both types of height-adjust systems are found predominately in use with metal lawn mower decks. Very few address the problems associated with mounting a height-adjust system onto a plastic deck and rely upon extra reinforcing to minimize the stresses applied to the deck through the wheel axles. Also, in both metal and plastic applications, many height-adjust systems require a large quantity of parts, are difficult to adjust without tools, and use non-standard components. Usually it is necessary for the operator to use both hands to adjust the positions of the wheels relative to the deck. Also, a problem inherent in systems which adjust one wheel at a time is the difficulty in ensuring that all four wheels ultimately are in the same position relative to the deck.

Systems which adjust two or more wheels at once solve this problem, but at the cost of requiring the operator to move the considerable weight of the deck, engine or motor and bag. Various counterbalance systems have been developed to permit the operator to adjust the height mechanism without strain, found predominently in the environment of a metal lawn mower deck. Inasmuch as metal is a stronger medium than plastic, a minimum of attention was devoted to developing means for handling the stresses on the deck generated by forces directed through the four separate lever/bell crank arrangements. Additionally, conventional systems require several parts, are intricate, and are not easily assembled and are expensive. Also, the height-adjust lever which is used to move all four wheels simultaneously is typically mounted in an exposed position, such as on the lawn mower push handle itself or on the upper surface of the deck.

Conventionally, if it is desired to manufacture lawn mowers incorporating both types of height-adjust systems, it would be necessary to manufacture and maintain in stock two or more different lawn mower configurations. Accordingly, there has existed a need to provide a single platform configuration upon which all of the different types of height-adjust systems can be readily mounted both simply and inexpensively. The need has been especially great to provide a single configuration of a unitary plastic lawn mower deck which is adapted to support such systems, and there has existed a corresponding need for height-adjust systems that would be compatible with such a deck.

SUMMARY OF THE INVENTION

It is an object of the present invention to provide lawn mower height-adjust systems which permit an operator to quickly and easily adjust the height of a ground-supported vegetation cutter, whether it is the type in which the height of each wheel relative to the deck is adjusted individually, or whether it is the type in which two or more wheels are adjusted simultaneously. A feature by which this is achieved in preferred embodiments of the present invention is by forming four annular axially-extending bosses on the deck side walls such that each boss defines a central bore, an axle slot, and a plurality of recesses formed in a predetermined array about the boss bore. This makes it possible for both types of height-adjust systems to be mounted on the same deck configuration, the individual height-adjust type making use of the predetermined array of recesses to lock an axle subassembly in a predetermined position relative to the deck, and the simultaneous height-adjust system utilizing the boss central bore and its outer annular surface to mount an axle subassembly. This reduces the costs that would otherwise be expended in providing multiple decks for several different types of height-adjust systems.

A further feature includes a height-adjust system for individually adjusting the heights of the vegetation cutter or lawn mower wheels which includes an axle subassembly having a cluster of fingers arranged in a predetermined array which are selectively engageable in mating recesses formed in the boss. These fingers are formed on a lock element of the axle subassembly, which prevents the axle from rotating from its position relative to the deck. The axle subassembly includes an axle element which is offset from the axis of the boss bore, so that rotation of the axle element will change the height of the lawn mower deck relative to the ground. The axle subassembly is releasably connected to the deck boss by a nut and bolt, so that to change the height of the wheel relative to the deck, the operator simply unscrews the nut from the bolt, removes the axle subassembly from the boss, and reinserts the lock element fingers in a second position relative to the deck. This step is followed by reconnecting the bolt and nut.

Yet another preferred feature provides an individual height-adjust subassembly which requires no disassembly to change the height. With a single rotation of a cam, the operator withdraws the teeth of a lock member from the boss, and a compression spring automatically reinserts the fingers into the recesses in a new position when the axle subassembly has been rotated a sufficient angular distance.

An additional preferred feature makes it possible to adjust the heights of at least two wheels relative to the deck simultaneously, the two wheels being mounted on an axle at respective offset portions, and the axle being rotatably connected to the deck via the bosses and axle slots. In the case where all four wheels are to be adjusted simultaneously, a connecting rod connects two axle subassemblies such that rotation of one axle through a predetermined arc will rotate the other axle to the same degree. A mechanism is provided which permits the operator to adjust the height of the deck to any of several discrete positions. A counterbalance system is provided which opposes the weight of the lawn mower and allows the operator to adjust the height of the deck simply by grasping a recessed release handle and an adjoining portion of the deck and either raising or lowering the deck to a desired position.

Finally, in the embodiment of the present invention in which four wheels are adjusted simultaneously, a system is provided which permits the lawn mower to automatically short-circuit the effect of an overload force on the deck isolating the overload from the height-adjust mechanism, by enabling the lawn mower deck to engage the ground upon application of the overload.

Accordingly, therefore, there is provided by the lawn mower height-adjust systems of the present invention, a deck having a plurality of recesses formed in a predetermined array thereon having a vegetation cutter (such as a blade or length of line) operatively associated with the deck and a driver (such as a motor or engine) drivingly connected to the vegetation cutter. At least one axle subassembly is connected to the deck adjacent a predetermined array of recesses and supports the deck in a first predetermined height above the ground. The axle subassembly includes an axle element and a lock element, the lock element defining a plurality of fingers removably engageable in said plurality of recesses in a first position to maintain the deck in the first predetermined height above the ground. The lock element is selectively movable to a second position so that the fingers engage a plurality of recesses and thereby locate the deck in a second predetermined height above the ground. Finally, there is provided means for fastening the axle subassembly to the deck.

In another embodiment of an individual height-adjust system, the lock element is selectively axially movable relative to the axle element such that the lock element fingers may be withdrawn from or inserted in the boss recesses, but the lock element nevertheless remains coupled to the axle element. The system also includes means for normally biasing the lock element fingers into engagement with the boss recesses and further includes operator-actuatable means for withdrawing the lock element fingers at least partially from the recesses against the urging of means for normally biasing the lock element. The operator-actuatable means includes a cam sandwiched between and coaxial with the axle and lock elements. The cam is connected to the axle element for rotation relative thereto and includes a first cam face cooperable with a second cam face formed on the lock element, such that rotation of the cam by the operator at least partially withdraws the fingers from the recesses. This height-adjust system further includes means operatively associated with the fingers and the boss for withdrawing the fingers totally from the recesses. The axle element, cam and lock element are rotatable in unison about the boss during at least a portion of the rotation of the cam, whereby the lock element and the axle element may be rotated from a first position to a second position, thereby changing the height of the deck relative to the ground.

In yet another embodiment of the present invention, a ground-supported vegetation cutter includes a deck which defines two side walls, each side wall further defining an axle aperture. An axle subassembly is rotatably connected to the deck in the axle apertures and supports the deck at a predetermined height above the ground. The axle subassembly includes an axle having a straight central portion defining an axle axis and an offset portion formed on each end of the axle central portion. Each axle offset portion extends axially outwardly from each side wall. An axle retainer is rotatably connected to the side wall of the deck adjacent the respective axle aperture. Each axle retainer defines an inner surface configured to match the configuration of the offset portion such that the axle offset portion may be inserted in the axle retainer, the axle retainer inner surface facing, and being adjacent to, a respective side wall. Finally, means are provided for trapping the axle offset portion in the axle retainer inner surface such that, when the axle retainers are connected to deck, the axle is substantially inhibited from moving axially or transversely relative to the deck, yet the axle is enabled to rotate freely relative to the deck. This ground-supported vegetation cutter may also be provided with means for counterbalancing the predetermined weight of the complete lawnmower, which includes at least one torsion spring coaxially mounted on each of two axles. Each torsion spring has one end which is fixedly connected to the axle and one extended end bearing against a deck element, the springs being wound to normally oppose rotation of the axles in a direction corresponding to a lowering of the deck relative to the ground. The ground-supported vegetation cutter of this embodiment of the present invention may also include means for selectively locking the axle including an axle index and a release handle including a handle index member selectively engageable with the axle index member in a plurality of discrete positions. It also includes means for normally biasing the release handle to maintain the handle index member in engagement with the axle index member. Finally, this embodiment of the present invention may include means operatively associated with the means for selectively locking the axle for causing the deck to engage the ground upon the application of an overload force of predetermined magnitude downwardly on the deck.

Other objects, features and advantages of the present invention will become more fully apparent from the following detailed description of the preferred embodiments, the appended claims and the accompanying drawings.

BRIEF DESCRIPTION OF THE DRAWINGS

In the Accompanying Drawings:

FIG. 1 is a left front perspective view of a ground-supported vegetation cutter or lawn mower incorporating one embodiment of the height-adjust systems of the present invention;

FIG. 2 is a left side elevational view of the deck of the lawn mower shown in FIG. 1 with the motor shroud removed;

FIG. 3 is an exploded perspective cut away view, partially in section, of the first height-adjust embodiment of the present invention;

FIG. 4 is a front elevational detail view of a first axle element shown in FIG. 3;

FIG. 5 is a left side sectional elevational view, taken along line 5—5 of FIG. 4;

FIG. 11 is a perspective view, partially cut away, of a second embodiment of the height adjust systems of the present invention;

FIG. 12 is an exploded perspective view with elements partially cut away of the second height-adjust embodiment of the present invention;

FIG. 13 is a section taken along the line 13—13 of FIG. 11, showing a second axle subassembly in a locked position on a boss formed on the deck, with the deck at a first height on relative to a wheel and therefore relative to the ground;

FIG. 14 is the same as FIG. 13, but showing a cam after having been rotated relative to a second axle element until being stopped by a surface on the second axle element, and after having moved a lock element axially outwardly from the axle element such that fingers on the lock element are almost totally withdrawn from mating recesses in the boss;

FIG. 15 is the same as FIG. 14, with the cam having been rotated an additional distance, but this time having carried the lock element and the second axle element with it so that the lock element fingers are now totally withdrawn from mating recesses in the boss and are now riding upon the outside surfaces of the axial walls separating the cavities in the boss;

FIG. 15A is an enlarged perspective schematic detail view of one of the fingers FIG. 15 riding on the outside surface of a boss axial wall;

FIG. 16 is the same as FIG. 15 except that the cam has now been rotated an angular distance sufficient to allow the lock element fingers to clear the walls and to drop into place in the boss cavities under the urging of a spring, such that the deck is now locked in a second elevation relative to the wheel;

FIG. 17 is a front elevational detail view of the lock element shown in FIG. 12;

FIG. 18 is a side elevational detail view of the lock element of FIG. 17;

FIG. 19 is a rear elevational detail view of the lock element of FIG. 17;

FIG. 20 is a side elevational detail view of the lock element of FIG. 17, taken from line 20—20 of FIG. 19;

FIG. 21 is a sectional detail view taken along the line 21—21 of FIG. 19;

FIG. 22 is another sectional detail view, this time taken along the line 22—22 of FIG. 19;

FIG. 23 is a schematic representation of the development of the cam profile of the lock element of FIG. 17;

FIG. 24 is a front elevational detail view of the cam of FIG. 12;

FIG 24A is a rear elevational detail view of the cam of FIG. 12;

FIG. 25 is a side elevational sectional view taken along the line 25—25 of FIG. 24;

FIG. 26 is a sectional detail view taken along the line 26—26 of FIG. 24;

FIG. 27 is a left front perspective view of a lawn mower according to a third embodiment of the present invention;

FIG. 28 is a right rear perspective view of the lawn mower of FIG. 27;

FIG. 29 is a left side elevational perspective view, taken from below, of a portion of the height-adjustment system according to the third embodiment of the present invention, showing elements of the system including the deck, axles, axle retainers and connecting rod;

FIG. 30 is an exploded elevational perspective detail view of the portion shown in FIG. 29, illustrating the relationship of the axle and axle retainer with respect to the boss formed on the deck;

FIG. 31 is a perspective view taken from below of the parts shown in FIG. 30 assembled to the deck, showing the relationship of an axle retaining clip;

FIG. 32 is a side elevational detail view of the release handle of the third embodiment of the present invention;

FIG. 33 is a front elevational detail view of the handle taken from line 33—33 of FIG. 32;

FIG. 34 is an elevational sectional detail view taken along line 34—34 of FIG. 32, and showing the relationship of the hand of a user to the handle in the handle chamber portion of the deck;

FIG. 35 is an exploded perspective detail view of an inverted lawn mower deck showing the arrangement of parts of the third embodiment of the present invention during the first steps of the assembly process;

FIG. 36 is similar to FIG. 35, but illustrating the addition of axle retaining clips;

FIG. 39 is a left side elevational schematic view of a deck subassembly showing the link between the front and rear axles and the relationship of the release lever to the deck, the deck being in its uppermost position;

FIG. 40 is an enlarged sectional detail view taken along the line 40—40 of FIG. 39;

FIG. 41 is an enlarged elevational detail view of the elements shown in FIG. 40;

FIG. 41A is an enlarged elevational schematic view illustrating the relationship of the index pin to index plate teeth and notch;

DETAILED DESCRIPTION OF THE PREFERRED EMBODIMENTS

Figure 6:
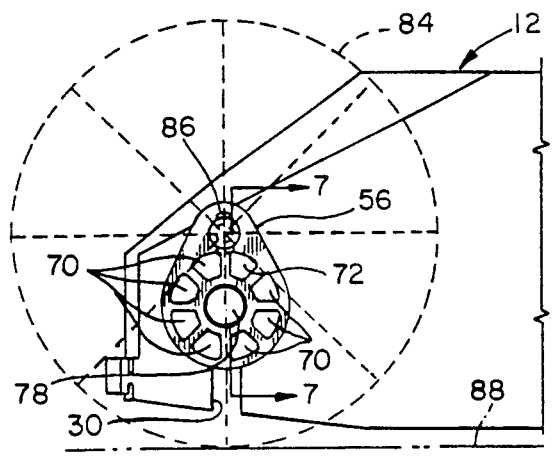
FIG. 6 is an elevational detail schematic view of the axle subassembly and wheel of the first height-adjust embodiment of the present invention, with the lawn mower deck shown in a lowered position.

All of the embodiments of the height-adjust systems of the present invention are usable with lawn mowers powered by any means, whether by electric motor, gasoline engine or hand-power. FIG. 1 shows a lawn mower employing the first embodiment of the height-adjust systems of the present invention, the lawn mower being designated generally as 10. The lawn mower 10 includes a deck 12 made from any suitable material, such as metal or plastic. The deck 12 of the lawn mower 10 is preferably a unitary structure made of polypropylene. A driver such as an electric motor (not shown) is covered by a shroud 14. The mower is supported on the ground through first axle subassemblies 16 and wheels 18. The operator guides the mower with a push handle 20 on which is mounted a power switch 22 connected to the motor (not shown) and to a power cord 24. When power is supplied to the motor, it rotates a vegetation-cutter, such as a blade or length of line (not shown) which cuts vegetation, to a first height above the ground. The vegetation cutter is operatively associated with the deck 12 such that adjustment of the deck height will adjust the height of cut. Referring now to FIGS. 1 and 2, the unitary deck 12 includes a side wall 26 having a bottom edge 28 and defining four axle slots 30. The axle slots 30 intersect respective bosses 32 for supporting the first axle subassemblies 16 and are formed at four locations on the deck wall 26. As seen in FIGS. 2 and 3, each boss 32 is defined by an outer annular circumferential wall 34 connected by evenly-spaced axial radial walls 36 to an inner annular circumferential wall 38, which defines a boss bore 40. The outer annular circumferential wall 34, the axial radial walls 36 and the inner annular circumferential wall 38 define a plurality of trapezoid-shaped large recesses 42, and, in combination with ridges 44 formed on the inner and outer annular circumferential walls, define at least one small recess 46, in a predetermined array. In the first embodiment of the present invention, the bosses 32 define clusters of five large recesses 42 and three small ones 46. As will be described shortly, by forming on an axle subassembly a locking element, a coacting cluster of seven small fingers and one large finger, all having trapezoidal cross sections matching the small and large boss trapezoidal recesses 46, 42, respectively, it is possible to limit the number of circumferential positions of the axle and therefore the number of variations in height to a total of five. It can be appreciated that the number of available height-adjust positions can be increased or decreased by changing the numbers of large and small recesses 42, 46. The boss outer and inner circumferential walls 34, 38, also define a boss front face 48. Formed on the front face 48 adjacent the outer annular circumferential wall 34 is an annular raised portion or rail 50 which provides a bearing surface upon which rotates the first axle subassembly 16. The unitary deck 12 also defines an involute 52 and handle support towers 54.

Referring now to FIGS. 3, 4 and 5, the axle subassembly 16 includes a first axle member 56, which in the preferred embodiment is a unitary member having a lock element or base portion 58 slidably and rotatably engagable with the deck bosses 32, a pedestal 60 and an axle portion 62 having an outer annular end 63. The base portion 58 is defined by an annular outer wall 64 which in turn defines an annular inner surface 65 which slidably and rotatably engages boss axial outer wall 34. Position indicia 66 are formed on the axle base outer wall 64 as are illustrated in FIGS. 3 and 4, in which groups of small ribs 66 are formed about the outer periphery of the axle base portion outer wall 64. The quantity of ribs 66 in a particular group corresponds to a predetermined relative height of the deck above the ground. Accordingly, the position indicia 66 provide tactile and visual signals to the operator so that each axle subassembly 16 can be aligned easily relative to the others. Note that the location of the position indicia 66 upon the axle base portion outer wall 64 enables the operator to clearly observe the position indicia without their view being blocked by a wheel 18, and without having to go through several body contortions to guess the respective height positions of the wheels.

This first embodiment of the height-adjust systems of the present invention also includes a feature which limits the range of discrete heights to which the first axle subassembly 16 may be adjusted. With reference particularly to FIGS. 2 and 3, and as was briefly noted above, the deck boss 32 defines five large recesses 42 and three small recesses 46, each having a generally trapezoidal cross section. Referring to FIG. 3, a front face 68 is formed on the axle base portion 58. Extending axially inwardly from the front face 68 toward the boss 32 are formed eight hollow fingers (seven small fingers 70 and one large finger 72). These fingers 70, 72 also define respective generally trapezoidal cross sections and are slidably engagable with the mating boss recesses 42, 46, as follows: the seven small fingers 70 will fit easily into the boss small recesses 46, and into large recesses 42. However, the single large finger 72 will only fit large recesses 42. This arrangement will prevent the first axle element 56 from being connected to the deck boss 32 in three of the eight available positions. In FIG. 3, the first axle member 56 is shown with its large finger 72 aligned with a small recess 46. This means that the operator will have to rotate the first axle element 56 until the large finger 72 becomes aligned with one of the large boss recesses 42. This feature also enables an operator to adjust the axle position by "feel".

A raised portion 73 is formed on the axle base front face 68 and extends axially outwardly of the front face in the opposite direction to fingers 70, 72, and defines a hexagonal fastener keeper 74. Referring now to FIG. 5, the axle base portion 58 also includes an inner face 76 which rides on the raised portion or rail 50 formed on each of the four deck bosses 32. The first axle member 56 is retained in position on the deck boss 32 by a hex bolt 78, washer 80 and nut 82.

Referring now to the sequential schematic views, FIGS. 6–10, a wheel 84 is slidably and rotatably mounted on axle portion 62 of the first axle element 56. The wheel is held in place by a suitable fastener, such as one having a barbed detent end as is shown at 86. To change the height of the deck 12 from a low position shown in FIGS. 6, 7 and 8 to a high position shown in FIGS. 9 and 10, the operator removes the washer 80 and the nut 82 and withdraws the first axle member 56 until the fingers 70, 72 have been withdrawn from their respective recesses 46, 42, and until the bolt 78 has been withdrawn from the boss bore 40. Note that in the position shown in FIGS. 6, 7 and 8, both the large finger 72 and the small finger 70 engage large recesses 42.

Figure 9:
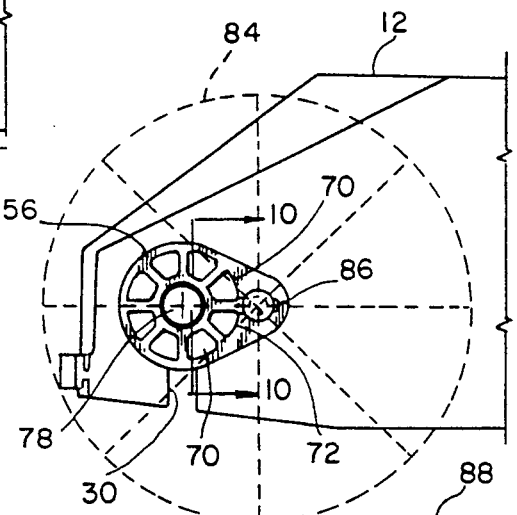
FIG. 9 is an elevational detail schematic view of the height-adjust system shown in FIG. 6, after the first axle subassembly has been rotated 90° to raise the deck to a higher position relative to the ground.
Figure 7:
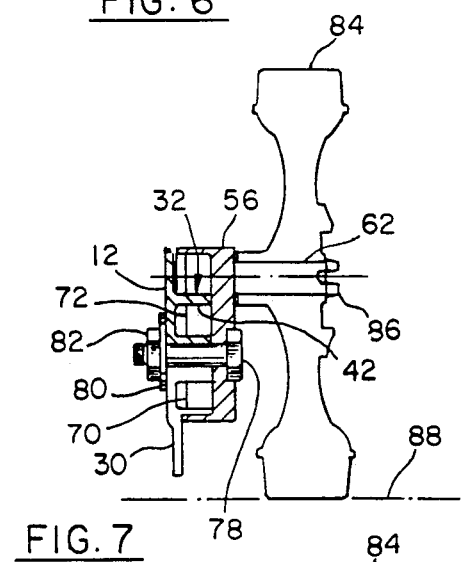
FIG. 7 is an elevational sectional schematic view taken along the line 7—7 of FIG. 6.
Figure 8:
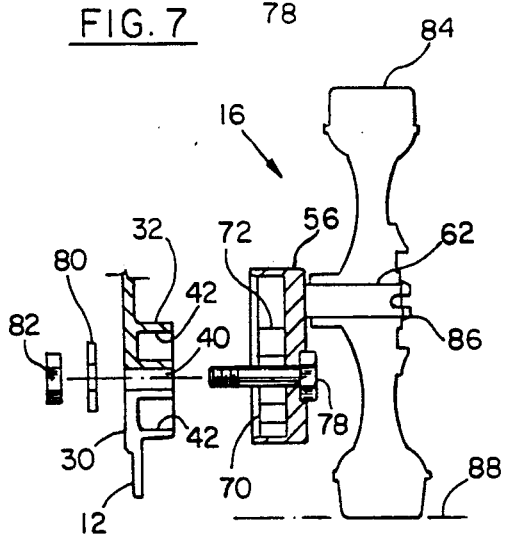
FIG. 8 is an elevational sectional schematic view of the first height-adjust axle subassembly and wheel shown in FIG. 7, shown removed from the wheel boss of the deck.
Figure 10:
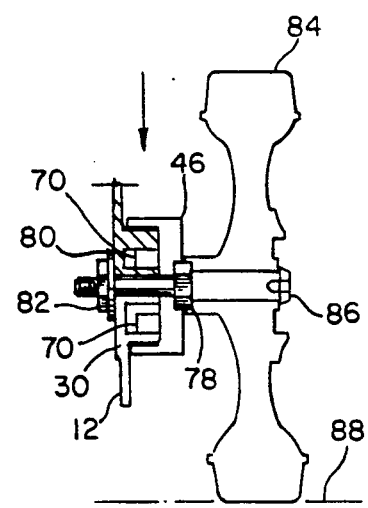
FIG. 10 is an elevational sectional schematic view taken along the line 10—10 of FIG. 9.

To raise the lawn mower deck, the operator rotates the first axle member 56 until it reaches the position shown in FIGS. 9 and 10. The axle fingers 70, 72 are reinserted into the mating recesses 44, 42, the bolt is reinserted into the bore 40 and the subassembly 16 is locked into place by reattaching washer and nut 80, 82. As shown in FIGS. 9 and 10, the rotation of the offset first axle member 56 relative to the boss 32 has raised the deck relative to the wheel 84 and to the ground 88.

At this point it can be seen that the first embodiment of the height-adjust systems of the present invention uses a minimum of parts and is easily adjustable. Even though it is of the type in which each of the four wheels' position is adjusted individually, the position indicia 66 of the present invention make it a simple matter to ensure that all four wheels 84 are at the same position relative to the deck. If desired, the first axle element 56 may be formed of more than one piece, but in the preferred embodiment, it is a unitary plastic member formed of glass-filled nylon. The coaction of the interlocking fingers 70, 72 and recesses 46, 42 distribute stresses throughout the boss 32 and deck 12. This is an effective system for mounting the wheels 84 onto a plastic deck, eliminating the need for excess ribbing and reinforcement members. However, it will be appreciated that the first embodiment of the present invention is not restricted to applications involving plastic decks or other plastic components, but may be made of metal or metal and plastic, for example.

There has also been a need for an individual wheel height-adjust system which is not disassembled to change the height, yet which nevertheless is compact and easy to operate. The one-hand height-adjust system of a second embodiment of the present invention fulfills the need, and is shown in FIGS. 11-26. Referring now to FIGS. 11 and 12, a second axle subassembly is shown generally as 90. For this embodiment of the present invention, the same deck 12 is used as was used in the first embodiment. Also, the same boss 32 is used to support the second axle subassembly 90 as was used to support the first axle subassembly 16. This commonality of decks is not necessary for the function of the present invention, but by using the same deck as a foundation for each of the two height-adjust embodiments, considerable manufacturing efficiencies can be realized. Referring to FIG. 11, the second height-adjust subassembly 90 is compact and is shown in its mid-height position. To raise the mower deck 12, the operator needs only to rotate a cam in the clockwise direction as shown by arrow 92, or to rotate it counterclockwise as shown by arrow 94 to lower the deck. As will be seen, the raising and lowering is accomplished with a single motion of one hand and does not require disassembly of the elements. With respect to FIGS. 11 and 12, the second height-adjust subassembly 90 includes a second axle element 96 slidably and rotatably mounted over the boss 32, a lock element 98 slidably and rotatably mounted on the second axle member and a user-actuated cam 100 sandwiched between the second axle member and the lock element and slidably and rotatably engagable with both. As shown in FIG. 11, the subassembly 96 is held in a normally locked, compact group by a compression spring or biaser 102, which is trapped between the head 104 of a bolt 106 and a surface on lock element 98. A washer 108 and nut 110 secure the subassembly 96 to the deck 12, while allowing sufficient free play to permit rotation of the subassembly relative to the deck 12, and of the subassembly elements relative to one another.

The second axle element 96 is very similar to the first axle element 56 with the main difference being that the fingers 70, 72 of the first axle element have been replaced by seven small trapezoidal through-apertures 112 and one large trapezoidal through-aperture 114. The fingers 170, 172 instead now are mounted on lock element 98, which does not rotate relative to second axle element 96, but only moves axially a distance sufficient for the fingers to clear the recesses 44, 46 formed in the boss 32. By referring to sequential FIGS. 13, 14, 15, 15-A and 16, it may be seen that by rotating cam 100, the operator will lift the lock element 98 out of its FIG. 11 position flush with respect to cam 100. The more the cam 100 is rotated, the more the lock element 98 will be axially withdrawn from the cam 100, and the more the fingers 170, 172 on the lock element will be withdrawn from the recesses 42, 44 in the boss, until ultimately the second axle element 96 is free to rotate relative to the boss, and therefore advance to the next height position selected by the operator. The step-by-step coaction of the elements of the second embodiment of the of the present invention will be explained in greater detail shortly.

Returning once again to details of the structure of the second axle element 96, an axle base portion 116 is rotatable about an axis 118, which is coaxial with the axes of the boss 32, lock element 98 and cam 100. An axle portion 120 is connected to the base portion 116 by a pedestal portion 122, and is coaxial with an offset axis 124 which is parallel to the axis 118. With respect to FIGS. 11 and 12, and sequential FIGS. 13-16, the second axle element base portion 116 has a front face 126, a rear face 128 and an annular external wall 130, which in turn defines first and second inner annular wall surfaces 132 and 134, respectively. The outer wall surface 130, the second inner annular wall surface 134 and the rear face 128 of the second axle element 96 in turn define an outer annular lip 136 on which is slidably and rotatably mounted cam 100, as will be described. A central annular bore 138 is sized to allow a reduced diameter portion 140 of bolt 106 to pass freely therein. Referring now to the pedestal portion 122 (FIG. 12), stop surfaces 142 are formed on both sides of the pedestal to limit the clockwise and counterclockwise rotation of the cam 100.

The details of lock element 98 are shown in FIGS. 12, 13-16 and 17-23. Referring to these figures, it can be seen that one of the factors contributing to the compactness and ease of assembly of the second axle subassembly is that the elements are designed to nest together in a compact stack. One way in which this is achieved is by forming the elements with respective coacting axial lips and channels. Referring now to FIG. 12 and FIGS. 17-23, the lock element 98 includes an axially-extending finger portion 144 which is surrounded by a first annular axial cam portion 146, which axially extends from a lock element base 148. The base 148 includes an outer annular wall 150 and an inner annular wall 152 (which itself is defined by an outer annular wall of the first cam portion 146). The inner annular wall 152 extends axially in two levels, forming ramps or stop portions 154 (FIGS. 19, 20) which coact with mating surfaces on the cam 100. The lock element base 148 includes an inner surface 156 and an outer surface 158. The base inner surface 156 and the outer and inner annular walls 150, 152 define a channel 160, which is adapted to permit free movement of an axially-extending wall on the cam 100. The first cam portion 146 defines a first cam face 162 which is double-sided to permit raising or lowering the height of the wheels by rotating the cam in either a clockwise or counterclockwise direction. With particular reference to FIGS. 19 and 23, the first cam face 162 includes a starting point 164 and three equally-distant sets of flat peaks 166 and relatively sharp troughs 168. FIG. 23 shows the angular dimensions of the cam profile of the preferred embodiment. The finger portion 144 includes seven small fingers 170 and one large finger 172, all having substantially trapezoidal cross-sections, as was the case with the fingers of the first embodiment of the height-adjust systems of the present invention. The tips of the fingers 170, 172 are chamfered as at 174, which, as illustrated in FIG. 15A, permit the fingers to ride up over the walls 36 separating adjacent boss recesses 44, thereby enabling the cam/lock element/second axle member subassembly to rotate in unison relative to the boss 32, as will be described. The lock element 98 further includes a bore 176 and a spring bearing surface 178 formed on a web 180 connecting the fingers 170, 172.

The last major element of the second embodiment of the present invention is the cam 100. With respect to FIG. 12, the cam 100 is shown with its cam surface facing axially outwardly of the boss 32 and opposite to the axially inwardly-facing first cam face 162 of the lock element 98. To simplify matters, when reference is made to an "outer" or "outwardly facing" item, that means "axially outwardly with respect to the boss 32"; conversely, the words "inwardly" and "inwardly-facing" mean "axially inwardly with respect to the boss". The cam 100, as shown in FIGS. 12, 24, 24A, 25 and 26 can be best described by considering the cam to include an outward portion 182 and inward portion 183 (see FIG. 25). The outward portion 182 includes an annular cam portion 184, which includes an outwardly facing second cam face 186 having three equally-distant relatively sharp lobes 188 and three equally distant flat lands 190, which generate the same cam profile as was generated on the first cam face 162 and as is shown in FIG. 23, such that, when the cam 100 is in the nested, locked position with respect to the lock element 98 (shown in FIG. 13) the three lobes 188 nest in and match the lock element troughs 168 and the three flat peaks 166 of the lock element nest in and match the three flat lands 190 of the cam. The annular cam portion 184 also defines a radially inwardly annular pilot surface 192 adapted for axial and rotatable sliding movement on the annular outer surface of the finger portion 144 of the lock element 98. The cam portion 184 also defines a radially outwardly-facing outer cylindrical surface 194 which is adapted for sliding axial and rotatable movement with the second axle element's radially inner surface of the base portion wall 136 and the radially inner surface 123 of the pedestal portion 122 of the second axle element 96. A radially inner annular partial wall 194 (FIG. 25) extends for approximately 185° about the cam portion 184 such that the midpoint of the inner partial wall is radially aligned with with middle cam lobe 188, as shown in FIG. 24. The outward portion 182 of the cam 100 further includes an outer surface 197 of wall 194. A radially outer wall 198 extends for an angular length of approximately 210° and is also centered at the middle lobe 188 of the cam portion 184. Wall 198 has a radially inwardly cylindrical surface 200 and a radially outer cylindrical surface 202. A web 204 connects the cam portion 184 to the outer partial wall 198. The axially outer face of web 204 defines a floor 206 having ramps 208 at each end (FIG. 24), which taper axially inwardly for engaging mating ramps 154 formed on the outer wall of the lock element 98. These serve, among other things, as stops to limit the relative rotation between the lock element 98 and the cam 100, with the cam in the centered or locked position relative to the lock element as shown in FIG. 13. When the operator rotates the cam 100, these cam ramps 208 move relative to the mating ramps 154 on the lock element and assist in moving the lock element 98 axially outwardly relative to the boss 32. The outer and inner partial walls 198, 196, respectively, together with the floor 206, form a second channel 210, so that the outer wall 150 of the lock element 98 extends axially inwardly to nest in the second channel for axial and rotary movement relative to the cam 100, and the cam inner partial wall 196 extends axially outwardly into the first channel 160 formed on the lock element, as is shown in FIGS. 13-15.

Now looking at the axially inwardly-facing portion 183 of cam 100, and with particular reference to FIGS. 24A and 25, an annular bearing surface 212 lies in a plane perpendicular to the axis 118 of the cam and is adapted to ride on the front face 126 of the base portion 116 of the second axle element 96. The annular bearing surface 212 is supported on a radially outer curved surface 216 which, together with the web 206 and the outer wall 198, creates a third channel 216 in which travels the lock element base portion outer wall 150, while the cam inner annular surface 200 is being piloted on the lock element base portion annular external wall 130. These relationships can be seen in FIGS. 13-16. In the preferred embodiment of the present invention, the respective axial dimensions of these different parts of the second height-adjust subassembly 90 are sized so that the lock member base outer surface 158 is approximately flush with the axially outer edge of the cam wall 198, as is particularly shown in FIG. 11. Three equally distant ribbed finger portions 218 are formed on the outer wall 198 to extend radially a sufficient distance to permit grasping by the fingers of an operator. One is formed at each end of the partial outer wall 198 and the third is centered radially with respect to the center cam lobe 188. The two finger portions 218 at the ends of the outer wall 198 form junctions 220 which, when the operator rotates the cam 100, engage the respective pedestal stop surfaces 142 formed on each side of the second axle element pedestal portion 122. As was previously described, this feature limits the amount of rotation, either clockwise or counterclockwise, of the cam 100 relative to the second axle element 96, as shown by arrows 92, 94 in FIG. 11.

As was noted, the elements of the second embodiment of the present invention are assembled into a compact package as shown in FIG. 11 by virtue of the ways in which the respective elements nest within one another. Referring now to FIG. 12 and to FIGS. 13-16, the cam 100 is assembled to the second axle element 96 by piloting the third channel 216 over the outer axial annular lip 136 of the second axle element 96, with the two ribbed finger portions 218 placed on each side of the pedestal portion 122, and the outer surface 197 of the cam wall 194 nested against the inner curved surface 123 of pedestal portion 122. The cam 100 is free to rotate a limited distance, either clockwise or counterclockwise relative to the second axle element 96, until, as was described above, the respective junctions 220 engage respective stop surfaces 142 formed on both sides of the pedestal portion 122. The lock element 98 is then assembled to the second axle element/cam subassembly by inserting the respective lock element fingers 170, 172 in respective mating through-apertures 112, 114 in the second axle element 96. Simultaneously, the annular finger cluster and coplanar outside annular surface 181 of web 180 (FIG. 12) are piloted against the inner pilot surface of the cam portion 184, and the first channel 160 of the lock member 98 is piloted over the inner partial wall 194 of the cam, 100 while the lock element outer annular wall 150 is piloted in the cam second channel 210, against the inner surface 200 of the cam outer wall 198. The lock element 98 is pushed axially inwardly until the base outer surface 158 is flush with the axially outer-most edge of the cam outer wall 198, as shown in FIG. 11 and FIG. 13. As shown in FIGS. 11 and 13, the three-element subassembly is in its locked position. The biaser or compression spring 102 is then inserted into the lock element 98 and the bolt 106 is inserted into the spring and the three-element subassembly. The subassembly is then connected to the boss by piloting the first inner annular wall surface 132 of the second axle base portion 116 over the boss outer circumferential wall 34, such that the lock element fingers 170, 172 engage mating recesses 42, 46 in the boss 32, and the bolt reduced portion 140 enters the boss bore 40. The washer 108 and nut 110 are then assembled to the bolt until the subassembly is snuggly attached to the deck 12.

The sequence of operation of the second embodiment of the height-adjust system of the present invention may be seen by looking at FIGS. 13-16. In FIG. 13, the second height-adjust subassembly 90 is shown in a locked position relative to the boss 32, such that the axle portion 120 and wheel 84 are at a predetermined position or height relative to the deck 12. Throughout the following description it will be helpful to recall that the only element which moves axially relative to the boss or to the other elements in the height-adjust system is the lock element 98. However, by virtue of the interengagement of the lock element fingers 170, 172 with the mating through-apertures 112, 114 in the second axle element 96, the lock element 98 is prevented from rotating relative to the second axle element, and is forced to rotate in unison with the second axle element.

If the operator wishes to change the height of the deck above the ground, the operator grasps two of the ribbed finger portions 218 and simply rotates the cam 100. If the cam is rotated clockwise (as seen from the position of an operator looking from the wheel 84 inwardly to the boss 32) and as seen in FIG. 14, the coaction of the respective cam faces 186 (cam) and 162 (locking element) forces the locking element axially outwardly as shown by arrow 222. This will withdraw fingers 170, 172 almost completely out of respective recesses 42, 46 in the boss 32. As yet, there has been no relative rotational motion between the second axle element 96, the lock element 98, and the boss 32. This is the first step of the adjustment process.

Referring now to FIGS. 15 and 15A, as the operator continues to rotate the cam 100 clockwise, the fingers 170, 172 will ride up over the adjacent axial radial walls 36 of the boss 32, by virtue of the coaction of the finger chamfer portions 174 with the wall 36. This additional rotation will withdraw the fingers 170, 172 entirely from the deck boss 32, and is the second step of the height-adjustment process. Note that the lock element 98 is now moving both axially and rotationally as indicated by arrows 224 and 226, respectively, in FIG. 15. Referring now to FIG. 15A, the third step of the height-adjustment process includes the step of continuing the counterclockwise rotation of the cam 100 so that a finger 170 rotates to a position adjacent the beginning of the next recess 42, as indicated by arrow 228. As the operator continues to rotate the lock element 98, the compression spring 102 then drives the fingers over respective axial radial walls 36 of the boss 32 with an audible "click", which is also felt by the operator. This condition is illustrated in FIG. 16, in which the lock element 98 has moved both rotationally and axially, this time inwardly. That completes the fourth step of the process. The fifth and last step is completed by the action of the spring 102 which automatically thrusts the locking element all the way back into a locked position, similar to that shown in FIG. 13. In practice, the operator changes the height of the wheel with a single, quick rotational force on cam 100, allowing the spring 102 to do the work of completing the fourth and fifth stages of the process.

As shown in FIG. 12, the second embodiment of the height-adjust systems of the present invention includes the position indicia 66 of the first embodiment, but additionally enables the operator to adjust the height of the respective wheels easily, with one hand, and without having to disassemble any of the components. Also, by virtue of the nesting interengagement of the elements of the second axle subassembly 90, it will be appreciated that the system components can be assembled quickly. Although the respective elements of the second height-adjust subassembly are made of A.B.S. plastic, it will be appreciated that any suitable material can be used. Also, although the respective elements have been described as unitary structures, it can be appreciated that the word "element" will also include units which are multi-piece assemblies. For example, the second axle element may be formed in three separate pieces—the second axle base portion 116 being one piece, the axle portion 120 being another piece and the pedestal portion 122 being a third piece.

The same deck 12 may be used as the foundation of yet a third embodiment of the height-adjust systems of the present invention, in which the operator can raise and lower the deck relative to the positions of all four wheels simultaneously. A lawn mower embodying the third embodiment of the present invention is shown generally as 300 in FIGS. 27 and 28. Left and right side axle retainer subassemblies 302, 304 are shown in FIGS. 27, 28 and 35, and are set in the same position relative to the side of the deck 12. Thus, when a connecting rod 306 is placed in engagement with the left-side subassemblies, movement of one subassembly 302 from a first position to a second position will cause the identical movement in the other left-side subassembly. The connecting rod 306 is formed to clear the involute 52 protruding from the left side of the deck 12 in all positions of the axle retainer subassemblies 302 and the connecting rod. With respect to FIG. 29, the connecting rod 306 includes a straight portion 308, two angled portions 310 at either end of the straight portion and two axle retainer connection portions 312, each one connected to a respective angled portion, as is shown in FIG. 29. Referring once again to FIGS. 27 and 28, the deck 12 has a front portion 314 and a rear portion 316. As shown in FIG. 28, a rear deck cavity 318 is formed in the deck rear portion 316; as viewed from the rear of the mower 300, a recessed release handle chamber 320 is formed in the left portion of the deck 12, with a release handle access port 322 opening into the rear deck cavity 318. A release handle 324 is mounted for vertical pivotal movement within the deck 12 in the recessed release handle chamber 320. This location minimizes any opportunity that may exist for vegetation to come in contact with the release handle 324, a condition which is possible in conventional systems using a simultaneous height-adjust feature.

Each set of axle retainer subassemblies 302, 304 are connected by an axle 326. With respect to FIGS. 30 and 35, the axle 326 includes an axle straight portion 328, two axle offset portions 330, each of which includes a wheel support portion 332 and a right-angled portion 334 connecting the wheel support portion to the axle straight portion 328. In the preferred embodiment, the right-angled portion 334 is generally parallel to the side of the deck 12, and the right-angled portions of a particular axle 326 lie in substantially the same plane, so that, as seen in FIG. 35, the respective ends of an axle form similar crank-shaped structures. Accordingly, when the left side axle subassembly 302 located at the deck front portion 314 is rotated by the linking action of the connecting rod 306, the right side axle subassembly 304 is rotated by the same increment. Similarly, when axle 326 at the deck rear portion 316 is rotated, both the left-and the right-side axle-retainer subassemblies 336, 338 are rotated in unison, such that the respective locations of the rear wheels 18 relative to the deck 12 change simultaneously. Rotation of the axle 326 adjacent the deck rear portion 316 will move the connecting rod 306 and will cause the front set of axle retainer subassemblies 302, 304 to move in unison. Thus, if the operator rotates axle 326, all four wheels will be adjusted simultaneously to be in the same position relative to the deck.

Referring now to FIGS. 29, 30, 31 and 35, one element of the respective left-side or right-side axle retaining subassemblies 336, 338 is a left-side axle retainer 336 and a right-side axle retainer 338. As will be seen, the axle retainers 336, 338 act as multi-feature fasteners for holding the axles 326 in position on the deck, and for preventing them from falling through the axle slots 30. The left side axle retainer 336 includes a cup-shaped boss-engaging portion 340 which is slidably and rotatably engagable with a respective deck boss 32, which is preferably identical to the bosses discussed with respect to the first two embodiments of the present invention. The boss-engaging portion 340 is connected to an axle-supporting portion 344 through a right-angled portion 342, so that the axle supporting portion is offset relative to the axle 326. A connecting rod engagement portion 346 is also formed offset from the axis of the axle straight portion 328. With respect to FIGS. 30, 31 and 35, the sides of the axle retainers 336, 338 facing the deck 12 define respective internal axle channels 348 which match the contours of the axle offset portions 330. Also on the sides facing the deck 12 are annular bearing surfaces 350 which are slidably engagable with the boss outer circumferential wall 34. A connecting rod aperture 352 is formed through each connecting rod engagement portion 346 of left side retainers 336 such that they communicate with a right-angle portion of the axle channel 348. Referring now to FIG. 31, the axle offset portion 330 is shown in phantom and a left side axle retainer 336 is shown in solid. In the lower portion of FIG. 31, an axle channel wall 356 is depicted diagrammatically in phantom adjacent the right-angled portion 334 of axle 326. This represents one portion of the interior of the axle retainer 336. The axle is held in place in the retainer by an axle clip 358, which in the preferred embodiment includes two axle grip portions 360 extending outwardly and perpendicular to a pair of axle wedge portions 362 which are joined together by bridge 364. Detents 368 are formed on the opposite sides of the wedge portions 362 and engage a ledge of axle channel wall 356 upon insertion into the axle retainer 336. Referring to FIG. 30, the axle 326 is first inserted into slot 30 and up into the boss bore 40 before the axle retainer 336 is connected to the axle and boss 32. Again referring to FIG. 31, the axle 334 is inserted in the axle retainer 336 such that the wheel support portion 332 is coaxially mounted within the retainer axle-supporting portion 344. The axle right angle portion 334 is kept pressed into the axle channel 348 adjacent the right angle portion 342 of the axle retainer 336. Then the axle clip 358 is inserted such that the wedge portions 362 wedge the axle right angle portion 334 against the axle retainer 336. The clip 358 and the axle channel wall 356 are configured such that upon insertion of the clip, the detents 368 lock over the axle channel wall 356. The axle grip portions 360 of the axle clip 358 also engage the outer surface of the retainer right angle portion 334 such that the exteriors of the axle grip portions 360 are flush with the surface of the retainer 336. Inasmuch as the axle retainer boss-engaging portion 340 surrounds the boss 32, and inasmuch as the axle right angle portion 334 coacts with the axle retainer right angle portion 342, the axle 326 is prevented from axial movement in and out of the bore 40, and is also prevented from moving out of position along the slot 30. However, axle retainer 336 and axle 326 are free to rotate about boss 32, sliding on boss outer circumferential wall 34. The structures of the right side axle retainers 338 are the same as the left side retainers 336, except the connecting rod engagement portion 346 and the connecting rod aperture 352 are omitted, it being necessary to equip the mower with only one connecting rod 306.

One of the key elements of the third embodiment of the height-adjust system of the present invention is the release handle 324, which will be described in relation to FIGS. 32 through 36. Referring first to FIGS. 32 through 34, the release handle 324 includes a release handle pivot 370 formed adjacent a release handle rear portion 371. A cruciform release handle biaser support 372 is formed adjacent the release handle front portion 373, and as shown supports a release handle biaser or spring 374 which normally biases the release handle 324 away from the upper surface of the deck 12. A pair of index pin bosses 376 are formed in the lower portion of the handle 324, and are bored to accept an index pin 378 with a press fit. A release handle dust baffle 380 is formed on the inboard side of the handle, as shown in FIGS. 33 and 34, such that when the release handle is pivoted about pivot 370 to return to its normal rest position, the dust baffle 380 closes the space between the release handle access port 322 and the interior of the recessed release handle chamber 320, as is shown diagrammatically in phantom in FIG. 34. With further reference to FIG. 34, the handle 324 also defines a release handle grip portion 382 which defines a release handle grip recess 384. This permits the user to insert his or her fingers into the recess 384 as depicted by large arrow 386 and lift the handle upwardly as depicted by small arrow 388. The release handle moves within the deck chamber 320 defined by inside wall 390, upper wall 392 and outer wall 394. Referring once again to FIG. 35, the release handle 324 is pivotally connected to the deck 12 at pivot slots 395 formed in respective walls 390 and 394 of the release handle chamber.

Another feature of the third embodiment of the present invention is the use of counterbalance biasers or springs 396 to make the raising or lowering of the deck, complete with engine or motor and associated hardware, as effortless as possible, even though the lawn mower has a weight in the approximate range of 30 to 60 pounds. With respect to the axle at the rear of the mower, as shown in FIGS. 35, 36 and 40, counterbalance springs 396, in the preferred embodiment, are in the form of torsion springs wrapped loosely about and supported by axle 326. Two springs are used in the preferred embodiment, each with a spring force in the range of 8 to 12 pounds. Each spring 396 has an extended end 398 which bears against a portion of the deck 12, and a retained end 400 which is fixedly connected to the axle 326 through an index plate 402. Accordingly, as a result of the way in which the springs are wound, as shown in FIG. 35, coupled with the fact that the extended ends 398 bear against a fixed structure (deck 12), the torsion force of the springs will resist rotation of the axle 326 in a counterclockwise direction and will normally urge the axle to rotate in a clockwise direction, as viewed from the underside of the left side of the deck 12. This will have the effect of normally urging the deck upwardly with a force counter to that generated by the static weight of the deck, blade, motor or engine, handle and related hardware and leaf bag, if used. The index plate 402, as seen particularly in FIGS. 35, 36 and 39 through 41A, includes a plurality of index plate teeth 404 separated by index plate notches 406, which are formed in an arcuate array about the outer portion of a sector-shaped plate, preferably formed of metal. With reference to FIG. 41A, all of the forwardly (or upwardly) facing surfaces of teeth 404 are ramped as at 408, for the purposes which will be discussed later. The index plate 402 defines at least one index plate connection aperture 410 for attachment to the counterbalance springs 396. In the preferred embodiment, the index plate 402 is welded to the axle 326, but it can be appreciated that any suitable means for fixedly attaching the index plate to the axle will achieve the same purpose. Again referring to FIGS. 35 and 36, one or more counterbalance biasers or springs 396 may also be connected to the axle 326 at the deck front portion 314. A metal spring retainer plate 412 is welded to axle 326 at the location of each front axle counterbalance spring 396, and defines a spring retainer connecting aperture 414, by which the retained end 400 of the spring is attached to the axle. The spring extended end 398 bears against a spring abutment portion 416 formed on the deck 12. Again, the spring is wound such that it resists counterclockwise rotation of the axle and normally urges the axle to rotate in a clockwise direction, as viewed from the rear underside of deck 12. This spring has a force in the range of 10 to 15 pounds.

Figure 37:
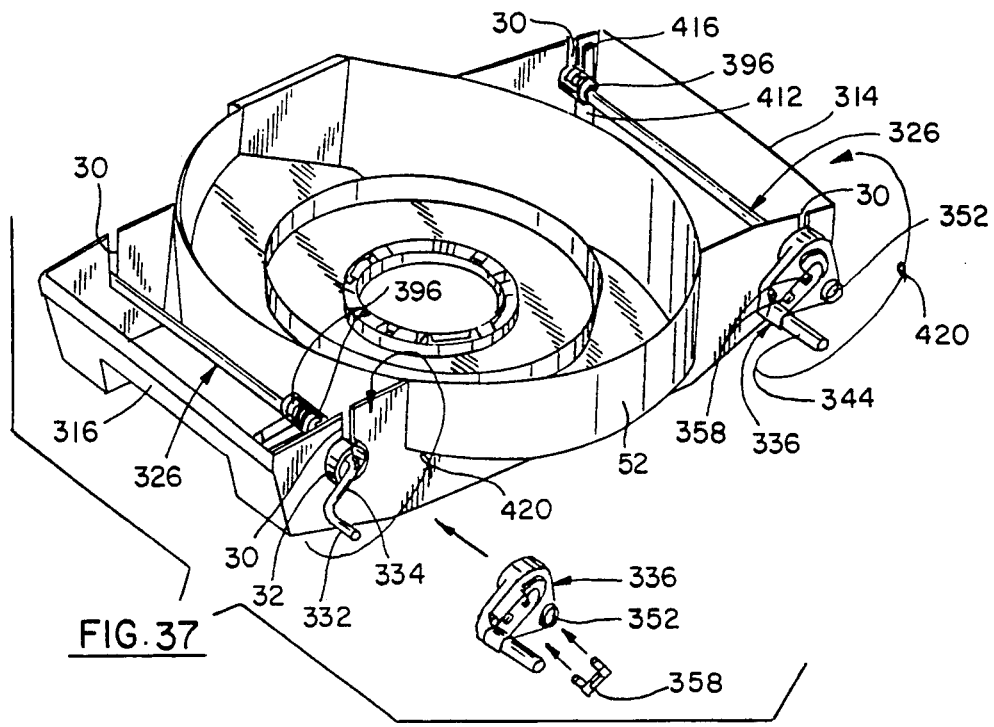
FIG. 37 is similar to FIG. 36, but illustrating the method for retaining the axles on the deck.
Figure 38:
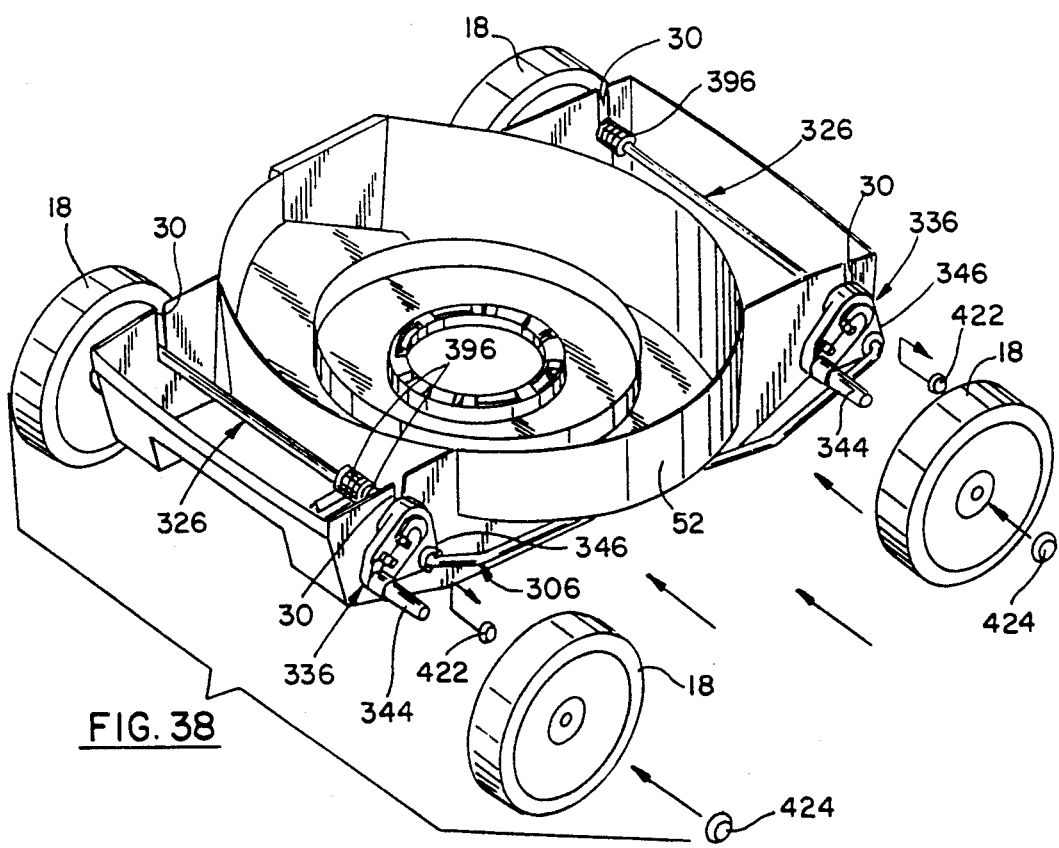
FIG. 38 is similar to FIG. 37 showing the last steps of the assembly process.

The procedure for assembling the third embodiment of the present invention is shown in FIGS. 35 through 38. The deck 12 is inverted; the counterbalance springs 396 are then placed over the axles 326, and the release handle compression spring 374 is mounted on the release handle biaser support 372 (FIGS. 32 through 34). Then the release handle 324, with spring 374 attached, is lowered into deck 12 such that the release handle pivot 370 engages the pivot slots 395 formed in the release handle inside and outside walls 390, 394. The index plate and spring retaining plate or plates are preferably fixedly connected to the respective axles prior to assembly to the deck, and the index plate is connected to the axle such that when the axle is loaded into the axle slots 30, the index plate is located adjacent the handle index pin 378, and the spring retainer plate 412 is located adjacent a respective deck abutment portion 416. The axle subassemblies (with springs 396) are placed into the deck via the axle slots 30. All of the axle retainers 336, 338, except the one closest to the release handle 324, are placed over the ends of the axles 326 and onto the bosses 32. The axle clips 358 are then inserted into the three axle retainers 336, 338 to lock the axle retainers to the axles 326, such that the front axle 326 is now fixed to the deck 12, while permitting respective offset portions 330 to pivot about the bosses 32. This is followed by the step of lifting the end of the rear axle 326 closest to the release handle 324 such that the index plate 402 can clear the release handle when the rear axle 326 is rotated. The next step is to rotate the rear axle 326 360° to load its counterbalance springs 396. Then the axle 326 is lowered fully so that the index plate 402 engages the index pin 378 in the release handle 324, and so that the spring extended ends 398 rest on the release handle pivot 370. This step also retains the release handle pivot 370 in place on the deck 12 eliminating the need for additional fasteners. Next, the remaining axle retainer 336 is placed over the axle 326 and onto boss 32. Now, as shown in FIG. 37, the remaining clip 358 is inserted into the axle retainer 336, which fixes the rear axle 326 to deck 12. Because of the coaction of the index teeth and notches 404, 406 with the release handle index pin 378, the rear axle 326 will not rotate about the deck bosses 12 unless the release handle 324 is raised sufficiently to disengage the index pin 378 from an index plate notch 406. The release handle biaser or spring 374 normally urges the pin 378 into engagement with an index plate notch 406. Next, the front axle 326 is rotated counterclockwise 360° to load its counter-balance spring or springs 396. As shown in FIG. 38, the connecting rod 306 is then connected to the connecting rod engagement portions 346 of the left side axle retainers 336. Then, cap fasteners 422 are inserted over the ends of the connecting rod 306 at the inboard side of the axle retainers 336, which will now enable the front and rear axles 326 to rotate in unison. Wheels 18 are then installed onto the plastic axle supporting portions 344 of the axle retainers 336, 338, and cap fasteners 424 are attached to the end of the axle 326 to retain the wheels on the axles. This completes the assembly. It can be appreciated that the order of the steps of assembly can be changed and still produce acceptable results.

Figure 42:
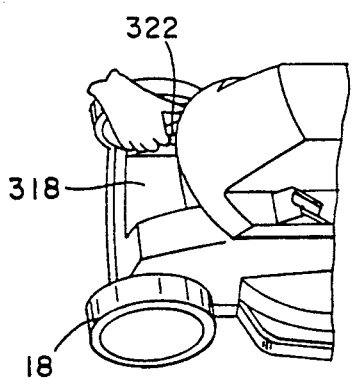
FIG. 42 is a perspective view of the rear portion of the third embodiment of the lawn mower of the present invention.
Figure 43:
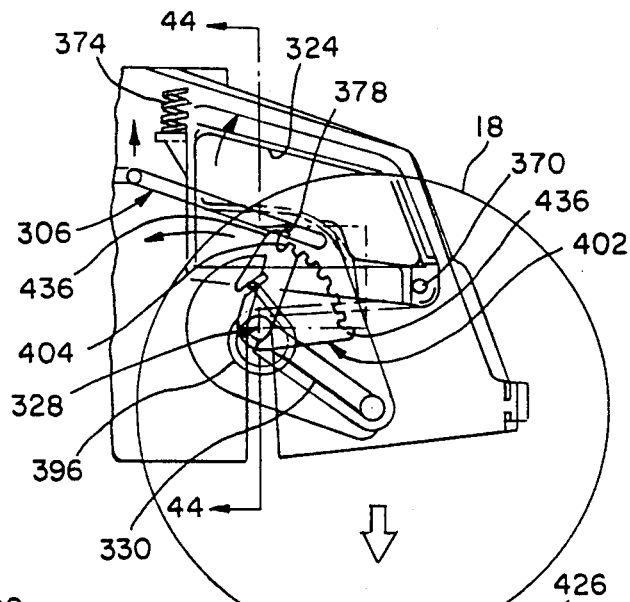
FIG. 43 is similar to FIG. 41, but with the release lever having been actuated.
Figure 44:
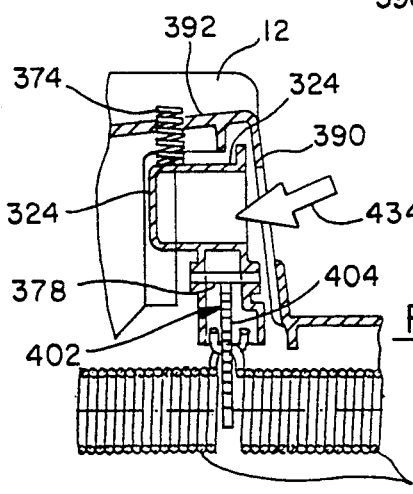
FIG. 44 is similar to FIG. 40, but illustrating the position of the operator's hand relative to the release lever while the lawn mower is in its uppermost position.
Figure 45:
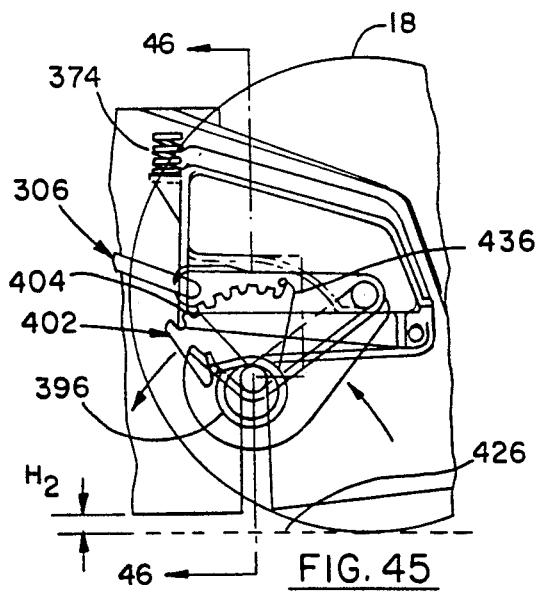
FIG. 45 is similar to FIG. 43 but showing the lawn mower having been lowered to its lowermost position.
Figure 46:
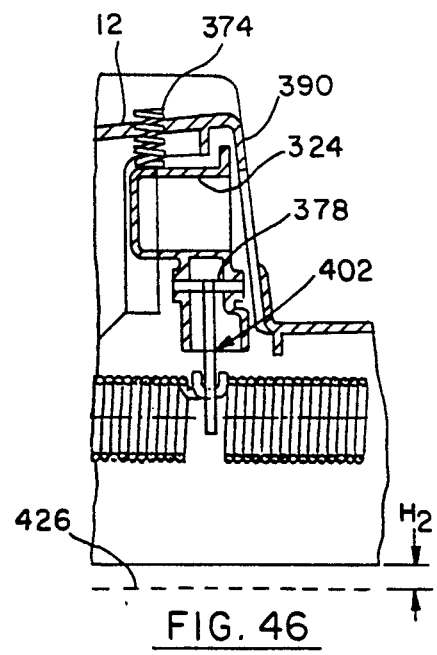
FIG. 46 is similar to FIG. 44 but illustrating the lawn mower in its lowermost position.
Figure 47:
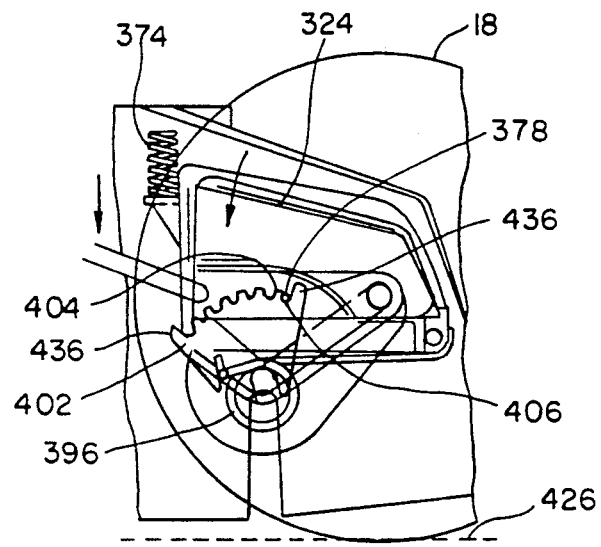
FIG. 47 is similar to FIG. 45 but showing the release lever in a locked position.
Figure 48:
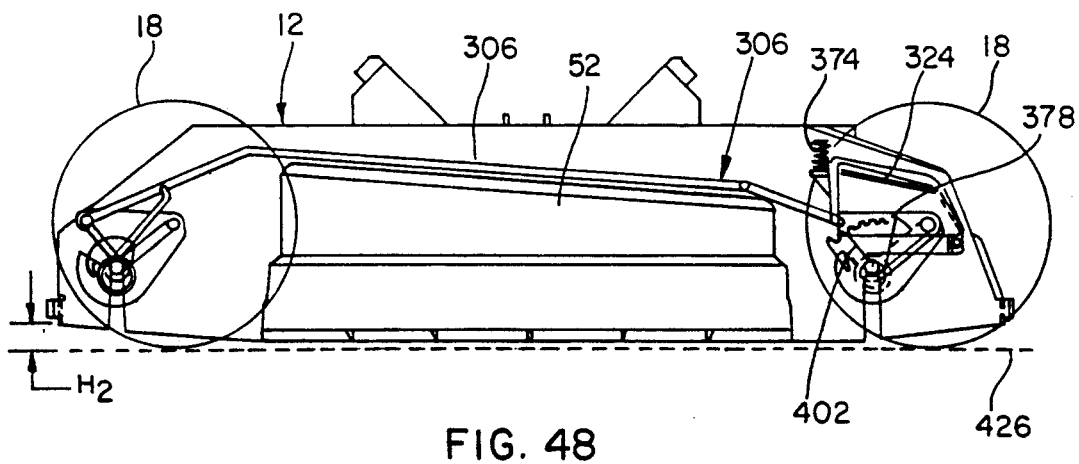
FIG. 48 is similar to FIG. 39 but showing the lawn mower in its lowermost position.
Figure 49:
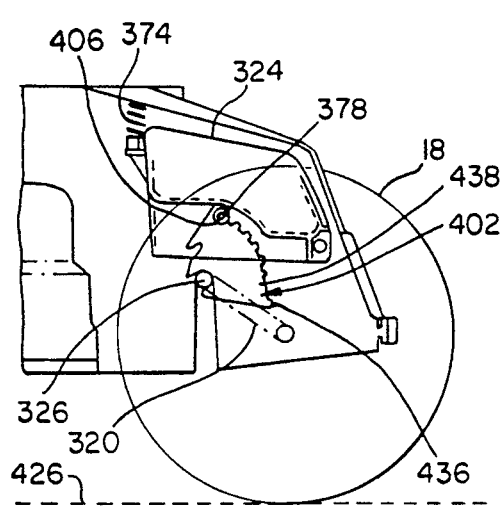
FIG. 49 is an elevational detail schematic view showing the relationship of elements of the third embodiment of the present invention, just prior to the application of a large overload force upon the deck.
Figure 50:
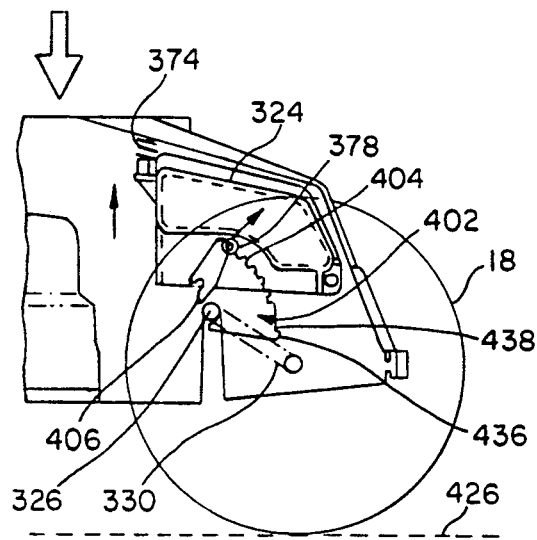
FIG. 50 is similar to FIG. 49 showing the reaction of the release lever to the application of the overload force.

The operation of the third embodiment of the height-adjust systems of the present invention can be visualized by referring to FIGS. 39 through 52. FIGS. 39, 40 and 41 show the lawn mower with the deck at a predetermined height $H_1$ above the ground. (It can be appreciated that by controlling the height of the bottom of deck 12 with respect to the ground 426, the height of the lawn mower vegetation cutter or blade (not shown) relative to the ground will be necessarily adjusted.) Referring to FIG. 41, the index pin 378 is shown in an index plate notch 406 corresponding to the highest elevation or height of the mower deck 12. Referring to FIGS. 40 and 41, the deck height is locked in the $H_1$ position by virtue of the coaction of the counterbalance springs 396 and the index plate 402 to exert a clockwise and upwardly-directed force through index plate notch 406 upon index pin 378, which is resisted by the release handle biaser or spring 374. To lower the deck, the operator reaches into the release handle access port 322 as shown in FIG. 42 and as indicated by arrow 434 in FIG. 44. The operator then raises the release handle 324 which pivots the release handle clockwise about handle pivot 370, as shown in FIG. 43. This lifts index pin 378 out of locking engagement with the index plate teeth and notch 404, 406, and will now permit the operator to lower the deck by pressing down on walls 392, 434 with the same hand used to hold the release handle 324 in the upward position against the force of spring 374. By pushing the deck 12 down, the axle 326 is carried down, and the axle offset portion 330, being offset from the axle 326, rotates counterclockwise as seen in FIG. 43 about the axis of the axle straight portion 328. As the axle 326 rotates counterclockwise, it carries the index plate 402 with it also, so that the index plate teeth 404 are carried past the raised index pin 378, until the operator selects one of the several positions in which to relock the height-adjust system. As shown in FIGS. 45 and 46, the axle has been rotated the entire angular distance spanned by the several teeth formed at the arcuate end the index plate 402. The index pin 378 is normally prevented from going past the terminal positions shown in FIG. 45 and in FIG. 43 by the provision of enlarged teeth 436 upon both circumferential ends of the index plate 402. FIG. 47 shows the position of the index pin 378 in locking engagement once again with the index plate 402 upon release by the operator of handle 324, and FIG. 48 illustrates the position of the mower deck in the lowermost locked position.

Figure 51:
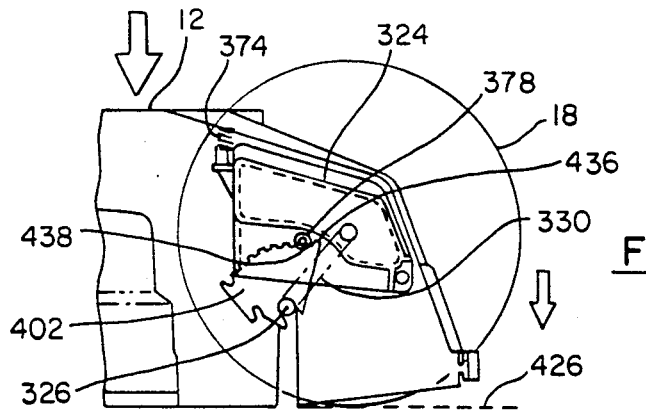
FIG. 51 is similar to FIG. 50 showing the deck in contact with the ground.
Figure 52:
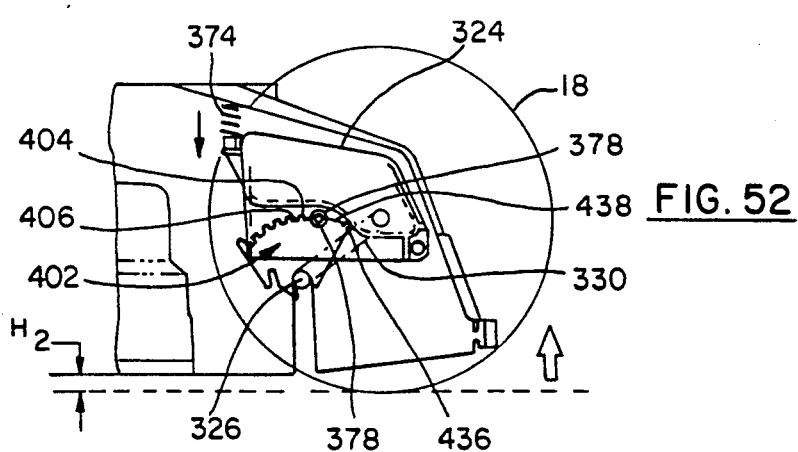
FIG. 52 is similar to FIG. 51 showing the lawn mower having automatically risen to its lowermost operating position, upon removal of the overload force.

If it is desired, another feature can be incorporated into the third embodiment of the present invention which will protect the height-adjust components from the effects of a large overload being placed upon the deck. With reference to FIG. 41A and to FIGS. 49 through 52, the index plate 402 is modified slightly to create a ramped notch surface 408, as seen in FIG. 41A, and to add an arcuate land 438 between the last notch 406 and the rear-most enlarged index plate tooth 436. These modications will enable the third embodiment of the height-adjust systems of the present invention to cope with abnormally high external loads being placed on the deck, such as those which are approximately one hundred pounds. This feature will allow the deck to descend until it contacts the ground, thereby short-circuiting or bypassing the load so it will not damage the height-adjust mechanisms. When the load is removed, the deck 12 will automatically rise and lock inself into the lowest position. This sequence is illustrated in FIGS. 49 through 52. When an overload is applied to the deck, as shown by the large arrow in FIG. 50, it is transmitted to the index plate 402 on the rear axle 326. As shown in FIG. 41A, the trailing edge of the notch 406 is formed at an angle A with a line 430 parallel to the radial axis of the index pin 428 when in the locked position. This angled rear-most edge 408 permits the index pin 378 to be ramped up the angled tooth against the spring pressure of the release handle spring 374. The index plate 402 is then free to rotate counterclockwise as shown in FIG. 51 until the index pin 378 engages arcuate land 438. The deck 12 has now bottomed out on the ground 426. When the load has been removed as shown in FIG. 52, the counterbalance springs 396 lift the deck 12 until the index pin drops into the first or rear-most notch, locking the mechanism in the lowermost position.

The third embodiment of the height-adjust system of the present invention is user-friendly, in that an operator can quickly and effortlessly change the height of the deck relative to all four wheels simultaneously. Although the sequence of operation has been described as the deck moving from a raised to a lowered position, conversely the operator may easily raise the deck from a lowered position as well, using the assist provided by the counterbalance springs. All the operator need do is press the release handle upwardly and grasp the adjacent portion of the deck in the same movement, and then simply apply upward force until the desired height is attained.

The above-described embodiments, of course, are not to be construed as limiting the breadth of the present invention. Modifications, and other alternative constructions, will be apparent which are within the spirit and scope of the invention as defined in the appended claims.

What is claimed is:

1. A ground-supported vegetation cutter, comprising:
   (a) a deck having a plurality of recesses formed in a predetermined array thereon;
   (b) a vegetation cutter operatively associated with said deck;
   (c) a driver drivingly connected to said vegetation cutter;
   (d) at least one axle subassembly connected to said deck adjacent said predetermined array and supporting said deck in a first predetermined height above the ground;
   (e) said at least one axle subassembly including an axle element and a lock element;
   (f) said lock element defining a plurality of fingers removably engageable in said plurality of recesses in a first position maintaining said deck in said first predetermined height above the ground;
   (g) said lock element being selectively moveable to a second position so that said fingers again engage said plurality of recesses thereby locating said deck in a second predetermined height above the ground; and
   (h) means for fastening said axle subassembly to said deck.

2. The ground-supported vegetation cutter claimed in claim 1, further comprising:
   (a) a boss formed on said deck and defining said predetermined array of recesses; and wherein
   (b) said axle element being slidably and rotatably mounted on said boss and including an axle portion supporting a wheel.

3. The ground-supported vegetation cutter claimed in claim 2, wherein:
   (a) said boss being an annular structure extending axially outwardly from a side portion of said deck and defining an annular array of recesses formed about a first axis;
   (b) said lock element defining an annular array of fingers;
   (c) said axle portion including a portion extending along a second axis offset from and parallel to said first axis, whereby rotation of said axle portion on said boss changes the height of said deck above the ground; and
   (d) said axle element and said lock element forming a unitary structure.

4. The ground-supported vegetation cutter claimed in claim 3, further comprising means formed on said lock element and operatively associated with said boss for limiting the number of lock element positions.

5. The ground-supported vegetation cutter claimed in claim 4, further comprising position indicia formed on said axle subassembly for indicating the position of said axle portion relative to said deck.

6. The ground-supported vegetation cutter claimed in claim 3, wherein four axle subassemblies are connected to said deck, each of said axle subassemblies including an axle element and a lock element.

7. The ground-supported vegetation cutter claimed in claim 1, wherein said lock element being selectively axially moveable relative to said axle element such that said fingers may be withdrawn from or inserted in said recesses.

8. The ground-supported vegetation cutter claimed in claim 7, further comprising:
   (a) an annular boss axially extending from a side of said deck and defining an annular array of said recesses formed about a first axis;
   (b) said lock element defining an annular array of said fingers formed about a second axis;
   (c) said lock element being mounted on said axle element and coaxial therewith such that said axle element is prevented from rotation relative to said deck unless said fingers have been at least partially withdrawn from said recesses.

9. The ground-supported vegetation cutter claimed in claim 8, further comprising:
   (a) means for normally biasing said lock element fingers into engagement with said boss recesses; and
   (b) operator-actuatable means for withdrawing said lock element fingers at least partially out of said recesses against the urging of said means for normally biasing said lock element.

10. The ground-supported vegetation cutter claimed in claim 9, wherein:
    (a) said operator-actuatable means including a cam sandwiched between, and coaxial with, said axle and lock elements;
    (b) said cam being connected to said axle element for rotation relative thereto; and
    (c) said cam including a first cam face cooperable with a second cam face formed on said lock element such that rotation of said cam by said operator at least partially withdraws said fingers from said recesses.

11. The ground-supported vegetation cutter claimed in claim 10, wherein:
    (a) said axle element includes an axle portion for mounting a wheel and a base portion slidably and rotatably mounted on, and coaxial with, said boss;
    (b) said base portion defining a plurality of through-holes arranged in the same array as are arranged the boss recesses; and
    (c) said cam being adapted to move said lock element fingers axially in said axle element through-apertures during the withdrawal or insertion of said fingers, respectively, from or into said recesses.

12. The ground-supported vegetation cutter claimed in claim 11, further comprising:
    (a) means operatively associated with said fingers and said boss for withdrawing said fingers totally from said recesses;
    (b) said axle element, cam and lock element being rotatable in unison about said boss during at least a portion of the rotation of said cam;
    (c) whereby said lock element and said axle element may be rotated from said first position to said second position.

13. A ground-supported vegetation cutter, comprising:
    (a) a deck defining two side walls, each side wall further defining an axle aperture;
    (b) an axle subassembly rotatably connected to said deck in said axle apertures for supporting said deck at a predetermined height above the ground;
    (c) said axle subassembly including an axle having a straight central portion defining an axle axis and an offset portion formed on each end of said axle central portion;
    (d) each axle offset portion extending axially outwardly from each side wall;
    (e) an axle retainer rotatably connected to each side wall on said deck adjacent a respective axle aperture;
    (f) each said axle retainer defining an inner surface configured to match the configuration of said offset portion, such that said axle offset portion may be inserted in said axle retainer, the axle retainer inner surface facing, and being adjacent to, a respective side wall; and
    (g) means for trapping said axle offset portion in said axle retainer inner surface such that, when said axle retainers are connected to said deck, said axle is substantially inhibited from moving axially or transversely relative to said deck, but said axle is enabled to rotate freely relative to said deck.

14. The ground-supported vegetation cutter claimed in claim 13, wherein each of said axle offset portions including a wheel-supporting portion lying along an eccentric axis parallel to, but offset from, said axle axis, such that rotation of said axle changes the height of said deck above the ground.

15. The ground-supported vegetation cutter claimed in claim 14, wherein:
    (a) each deck side wall defining two axle apertures;
    (b) two axle subassemblies being rotatably connected to said deck in said axle apertures; and further comprising
    (c) means for linking said two axle subassemblies such that rotation of one axle subassembly by a predetermined amount results in rotation of the other axle subassembly by the same amount.

16. The ground-supported vegetation cutter claimed in claim 15, wherein:
    (a) said ground-supported vegetation cutter having a predetermined weight; and further comprising
    (b) means for counterbalancing said weight;
    (c) said means for counterbalancing including at least one torsion spring coaxially mounted on each axle;
    (d) each said torsion spring having one end fixedly connected to said axle and one free end bearing against a deck element, said springs being wound to normally oppose rotation of said axles in a direction corresponding to a lowering of said deck relative to the ground.

17. The ground-supported vegetation cutter claimed in claim 16, further comprising means operatively associated with an axle and said deck for selectively locking said axle in a predetermined position relative to said deck.

18. The ground-supported vegetation cutter claimed in claim 17, wherein:
    (a) said means for selectively locking said axle including an axle index member formed on said axle and a release handle including a handle index member selectively engageable with said axle index member in a plurality of discrete positions; and
    (b) means for normally biasing said release handle to maintain said handle index member in engagement with said axle index member in one of said discrete positions.

19. The ground-supported vegetation cutter claimed in claim 18, further comprising means operatively associated with said means for selectively locking said axle for causing said deck to engage the ground upon the application of an overload force of predetermined magnitude downwardly on said deck.

20. A lawn mower, comprising:
(a) a deck defining two side walls, each having a lower edge;
(b) a motor mounted on said deck;
(c) a vegetation cutter drivingly connected to said motor;
(d) a boss formed on each of said side walls in opposing relation to each other;
(e) a first axle slot formed in said side walls adjacent said bosses;
(f) each first axle slot extending to and opening at said sidewall lower edges;
(g) each boss defining a central bore and a second axle slot opening into said first axle slot; and
(h) said deck being formed as a unitary plastic structure.

21. The lawn mower claimed in claim 20, wherein:
(a) each said boss having an annular outer wall and defining a plurality of axially-opening recesses formed in a predetermined array about said boss bore; and wherein
(b) said boss selectively supporting at least two different wheel supports, one of which being an axle mounted in said first and second axle slots and the other of which being a member engageable with said predetermined array of recesses.

* * * * *